United States Patent
Ricci

(10) Patent No.: US 9,836,083 B2
(45) Date of Patent: Dec. 5, 2017

(54) COMPLETE WEARABLE ECOSYSTEM

(71) Applicant: Flextronics AP, LLC, San Jose, CA (US)

(72) Inventor: Christopher P. Ricci, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 15/066,353

(22) Filed: Mar. 10, 2016

(65) Prior Publication Data

US 2016/0266606 A1    Sep. 15, 2016

Related U.S. Application Data

(60) Provisional application No. 62/132,343, filed on Mar. 12, 2015.

(51) Int. Cl.
| | |
|---|---|
| *G08C 19/22* | (2006.01) |
| *G06F 1/16* | (2006.01) |
| *H04W 4/00* | (2009.01) |
| *H04B 1/3827* | (2015.01) |
| *H04M 1/725* | (2006.01) |

(52) U.S. Cl.
CPC ............ *G06F 1/163* (2013.01); *H04B 1/385* (2013.01); *H04M 1/7253* (2013.01); *H04W 4/008* (2013.01); *H04M 1/72569* (2013.01)

(58) Field of Classification Search
CPC combination set(s) only.
See application file for complete search history.

(56) References Cited

U.S. PATENT DOCUMENTS

| | | | |
|---|---|---|---|
| 5,931,764 A | 8/1999 | Freeman et al. | |
| 6,619,835 B2 | 9/2003 | Kita | |
| 7,311,665 B2 | 12/2007 | Hawthorne et al. | |
| 7,813,715 B2 | 10/2010 | McKillop et al. | |
| 8,185,601 B2 | 5/2012 | Rauhala et al. | |
| 8,583,045 B2 | 11/2013 | Hsueh et al. | |
| 8,725,842 B1 | 5/2014 | Al-Nasser | |
| 8,732,373 B2 | 5/2014 | Sirpal et al. | |
| 8,787,006 B2 | 7/2014 | Golko et al. | |
| 8,810,533 B2 | 8/2014 | Chen | |

(Continued)

OTHER PUBLICATIONS

Charara "Xiaomi Mi Band Pulse review," Wareable, Jan. 13, 2016, 12 pages [retrieved online from: www.wareable.com/xiaomi/xiaomi-mi-band-pulse-1s-review].

(Continued)

*Primary Examiner* — Brian Zimmerman
*Assistant Examiner* — Thomas McCormack
(74) *Attorney, Agent, or Firm* — Sheridan Ross P.C.

(57) ABSTRACT

Methods and systems for a complete wearable ecosystem are provided. Specifically, systems that when taken alone, or together, provide an individual or group of individuals with an intuitive and interactive wearable device ecosystem. The wearable device ecosystem may comprise a number of wearable devices. Each wearable device may comprise a body and a shell. Any number of different shells may be interconnected interchangeably to the body. In one embodiment, the shell is decorative. The present disclosure builds on integrating existing technology with new devices, methods, and systems to provide a complete wearable ecosystem.

15 Claims, 20 Drawing Sheets

(56) References Cited

U.S. PATENT DOCUMENTS

| | | |
|---|---|---|
| 8,838,095 B2 | 9/2014 | Jouin |
| 8,862,152 B1 | 10/2014 | Buchholz et al. |
| 8,930,605 B2 | 1/2015 | Bosse et al. |
| 9,176,530 B2 | 11/2015 | Rothkopf et al. |
| 9,268,518 B2 | 2/2016 | Reeves et al. |
| 9,405,459 B2 | 8/2016 | Sirpal et al. |
| 2007/0152833 A1 | 7/2007 | Kaplan et al. |
| 2007/0287438 A1 | 12/2007 | Hansen et al. |
| 2008/0057868 A1 | 3/2008 | Chang |
| 2010/0081473 A1 | 4/2010 | Chatterjee et al. |
| 2011/0081860 A1 | 4/2011 | Brown et al. |
| 2013/0023254 A1 | 1/2013 | Ricci |
| 2013/0120106 A1* | 5/2013 | Cauwels ............... G06F 1/163 340/3.1 |
| 2013/0158369 A1 | 6/2013 | Yuen et al. |
| 2013/0198867 A1 | 8/2013 | Ricci et al. |
| 2013/0262298 A1 | 10/2013 | Morley |
| 2014/0279889 A1* | 9/2014 | Luna ............... G06F 17/30575 707/626 |
| 2015/0286813 A1* | 10/2015 | Jakobsson ............... G06F 21/35 726/9 |
| 2016/0091922 A1* | 3/2016 | Nazzaro ............... G06F 1/163 307/104 |

OTHER PUBLICATIONS

Charara "Tory Burch Fret bracelet is a gorgeous Fitbit accessory," Wareable, Apr. 2, 2015, 4 pages [retrieved online from: www.wareable.com/fitbit/tory-burch-fret-bracelet-is-a-gorgeous-fitbit-accessory-1020].

Charara "Samsung Gear S2 review," Wareable, Nov. 5, 2015, 24 pages [retrieved online from: www.wareable.com/samsung/samsung-gear-s2-review].

Charara "Fitbit CEO: Advanced sensors and coaching coming to Fitbit trackers," Wareable, Dec. 7, 2015, 6 pages [retrieved online from: www.wareable.com/fitbit/ceo-advanced-sensors-coaching-fitbit-trackers-2016].

Charara "Blocks modular smartwatch raises $1.6m on Kickstarter," Wareable, Nov. 20, 2015, 4 pages [retrieved online from: www.wareable.com/smartwatches/blocks-att-ee-cellular-standalone-smartwatch-1930].

Gil "NFL fits its players with real-time motion tracking chips," Wareable, Sep. 8, 2015, 4 pages [retrieved online from: www.wareable.com/sport/the-nfl-outfits-its-players-with-real-time-motion-tracking-chips].

Gonzalez "Smart health and fitness wearable devices for 2015," Wareable, Apr. 20, 2015, 8 pages [retrieved online from: www.wearable-technologies.com/2015/04/smart-health-and-fitness-wearable-devices-for-2015].

Lamkin "Tag Heuer Connected review," Wareable, Dec. 8, 2015, 14 pages [retrieved online from: www.wareable.com/android-wear/tag-heuer-connected-review-2015].

Lamkin "Moto 360 Sport: Everything you need to know about the new GPS smartwatch," Wareable, Dec. 2, 2015, 10 pages [retrieved online from: www.wareable.com/android-wear/new-moto-360-sport-2-price-release-date-specs].

Nield "How to set up and connect Android Wear," Wareable, Dec. 2, 2015, 10 pages [retrieved online from: www.wareable.com/android-wear/how-to-set-up-android-wear].

Sawh "Under Armour Band review," Wareable, Feb. 16, 2016, 13 pages [retrieved online from: www.wareable.com/under-armour/under-armour-band-review].

Sawh "Lumo Run sensor can now smarten up any running shorts," Wareable, Mar. 1, 2016, 4 pages [retrieved online from: www.wareable.com/smart-clothing/lumo-run-sensor-specs-price-release-date-2393].

Stables "Under Armour SpeedForm Gemini 2 Record Equipped review," Wareable, Feb. 29, 2016, 9 pages [retrieved online from: www.wareable.com/under-armour/under-armour-speedform-gemini-2-record-equipped-review].

Stables "Moov Now review," Wareable, Sep. 16, 2015, 19 pages [retrieved online from: www.wareable.com/sport/moov-now-review].

Stables "Athena personal security wearable aims to keep women safe after dark," Wareable, Oct. 21, 2015, 6 pages [retrieved online from: www.wareable.com/saves-the-day/athena-aims-to-keep-women-safe-after-dark-1847].

Stables "Apple Watch review," Wareable, Oct. 2, 2015, 22 pages [retrieved online from: www.wareable.com/apple-watch/apple-watch-review].

\* cited by examiner

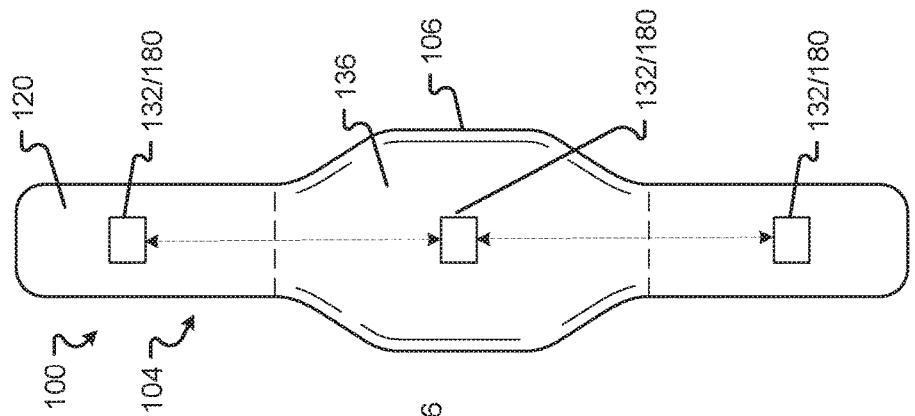
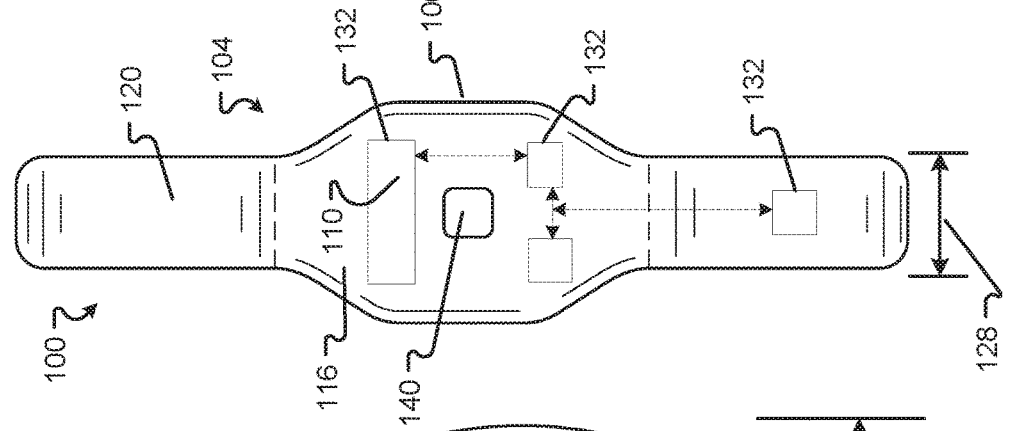
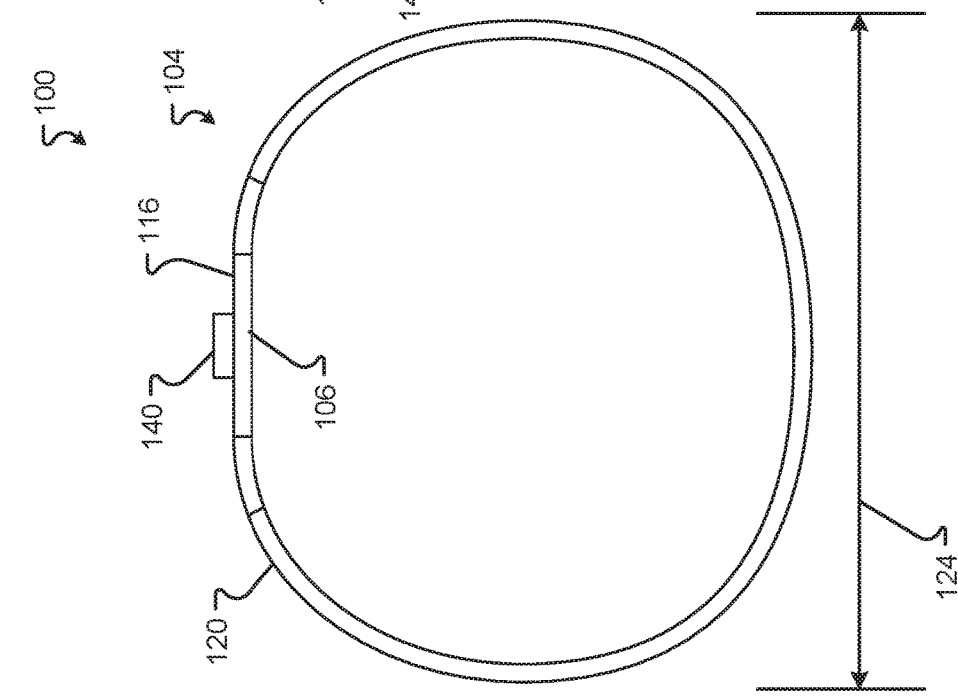
FIG. 1E
FIG. 1D
FIG. 1C

COMPLETE WEARABLE ECOSYSTEM

CROSS-REFERENCE TO RELATED APPLICATIONS

The present application claims the benefit of and priority, under 35 U.S.C. §119(e), to U.S. Provisional Patent Application Ser. No. 62/132,343, filed Mar. 12, 2015, entitled "COMPLETE WEARABLE ECOSYSTEM," the entire disclosure of which is hereby incorporated herein by reference, in its entirety, for all that it teaches and for all purposes.

BACKGROUND

Currently, wearable manufacturers have developed a series of devices to compete for the market of tracking a user's health data. Typically, these devices employ a power supply, a processing chip, a sensor, and a memory. The devices are generally configured to record heartrate, number of steps taken, or other measurements over time. Some devices are configured to send an emergency signal when activated to provide a location of an individual in distress. In any event, these devices are generally application specific and as such have been designed with a specific application in mind. For instance, waterproof devices may be used while swimming, devices having a simple rubber band may be used while working out at a gym, water resistant devices may be used while running or engaging in some other land-based activity, and other devices may be designed as a simple fashion accessory having a single function (e.g., sending a distress signal, etc.).

SUMMARY

There is a need for a wearable device which can integrate both physically and communicatively with other devices to result in a totally intuitive and convenient user experience. These and other needs are addressed by the various aspects, embodiments, and/or configurations of the present disclosure. Also, while the disclosure is presented in terms of exemplary and optional embodiments, it should be appreciated that individual aspects of the disclosure can be separately claimed.

The Internet of Things (IoT) is the idea of giving various products access to the Internet. Whether that is refrigerators, coffee makers, security systems, TVs, countertops, Jewelry, clothing, etc. However, one major drawback of IoT as it exists today is a lack of unity between the various "things" connected to the Internet. That is, every individual product exists in a self-contained bubble with perhaps a specific application for its own utility. So instead of one central hub for viewing all relevant information, users are confronted with a number of individual applications directed to parts of the information. For instance, a fitness application, a security system application, a TV application, a coffee making application, light applications, and others may act individually to record and report on information from a particular device.

Rather than continuing on this approach of requiring dozens of individualized applications which can only be utilized one at a time, the IoT would benefit from an "ecosystem" of sorts which allows each product to be in communication with a central hub or wearable device which can display the relevant information as needed, rather than requiring a different application for every product.

This concept applies equally to wearable technology. Currently, wearable devices have very specific functionality. There are Fitbits™, heart monitors, athletic clothing, step counters, shoe inserts, smart clothing, all with a certain functionality, but each needing its own application. Wearable technology needs the ability for synchronization and multi-functionality without the burden of having to monitor each specific functionality in a different application. As wearable technology becomes more and more commonplace, the number of applications has become burdensome. As the monitoring all of the data produced by various devices has become an hours long chore of opening and closing dozens of different applications, sorting and interpreting data, people have been deterred from investing in wearable technology. Thus, it is an aspect of the present disclosure to provide a complete wearable ecosystem. The complete wearable ecosystem may employ a number of devices configured to communicate with a central "hub" which can then be accessed, allowing the users to consolidate the workout, physical activity, and/or day's data into one place.

The present disclosure can provide a number of advantages depending on the particular aspect, embodiment, and/or configuration. Technology areas and devices such as user interfaces, applications, tracking capabilities, hardware, and/or location-based communications, could be combined together, or used separately, to form a complete wearable ecosystem. This ecosystem can provide a connected and intuitive user experience for any wearable user.

The complete wearable ecosystem may comprise a number of wearable components that are configured to collect and store information. This information may include health data (e.g., heart rate, blood pressure, breathing rate, etc.), location data (e.g., from Wi-Fi hot spots, cell tower data, GPS, etc.), fitness data (e.g., step count, distance traveled, workouts performed, etc.) and/or other data that can be measured by one or more sensors associated with the wearable device.

In one embodiment, the wearable device may include a body having a specific set of components that are designed to provide one or more functions. For instance, the body may include one or more components, such as, a processor, a memory, an accelerometer, a gyroscope, and/or a communications module (e.g., Wi-Fi, NFC, RF, cellular, etc.). In some embodiments, the body may include the components in a waterproof housing. In one embodiment, the waterproof housing may not include any visible electrical and/or data ports. In this embodiment, data and/or power may be transmitted from the wearable device to one or more other devices, servers, hubs, and/or peripherals wirelessly, based on proximity, or through induction. The body may include sensors positioned to be in contact with the skin of the user to detect bio-information (e.g., biometrics, etc.) of the user.

The body of the wearable device may be a universal frame with which one or more shells, and/or functional components, can be coupled. This coupling may be physical and/or communicative (e.g., wirelessly or wired) and/or a combination thereof. For example, a shell may be both physically and communicatively coupled to the body. In another example, a peripheral device may be communicatively coupled with the body, but may not be required to be physically connected or coupled to the body.

It is anticipated that the functionality of the wearable device may be increased or decreased by coupling, or pairing, the body of the wearable device with a shell, or casing, or by replacing a first shell coupled to the wearable device with a different second shell. The shell may include one or more of sensors, power supplies, RFID components, lights, displays, communications modules, memory, processors, transmitters, receivers, transceivers, cameras, antennae, and the like. In some embodiments, the shell may be communicatively coupled to the body of the wearable device. This communication may include the transfer of power and/or transfer for exchange of data. In one embodiment, communicatively coupling the shell with the body may include pairing the shell to the body (e.g., via Bluetooth™, NFC, other wireless communications protocol, etc.). Another embodiment may use a wired or physical connection between the shell and body to effect pairing. Once paired, the body and shell may share one or more of power, data, processing resources, and other resources.

Increasing the functionality of the wearable device may include allowing one or more components of the shell to be used by the body, and/or vice versa. For instance, a shell may include additional sensors (e.g., beyond those sensors found in the body of the wearable). In this example, when the shell is coupled with the body, the sensors of the shell may be configured to collect and provide, or forward, data that can be interpreted by the processor of the wearable device and stored in the memory of the body or the shell of the wearable device. As another example, a shell may comprise a display and display circuitry that is configured to receive and interpret information provided by the body of the wearable device. Continuing this example, the display may be configured to graphically present information corresponding to information collected by the components of the wearable device (e.g., whether on the body, the shell, or combinations thereof, etc.) and stored in a memory (e.g., of the body, shell, and/or combinations thereof).

In some embodiments, it may be deemed necessary to decrease the functionality of the wearable device. This decrease may be achieved physically (e.g., using mechanical, electrical, or electromechanical components, etc.) and/or virtually (e.g., via software, etc.). For instance, a user may wish to attend a party, but may wish to block any tracking information that otherwise might have been collected during the party. In one embodiment, the functionality of the wearable device may include providing a Faraday cage, or shield, as part of a shell. The user may select the shell and couple the shell with the body. The Faraday cage shell can then serve to block signals emitted by the body and even signals that are emitted by one or more other devices. As can be appreciated, the cage may be configured to block one or more frequencies or signals. In another embodiment, this decrease in functionality may be achieved using software run on the processor of the body and/or shell. In one embodiment, the software may be configured to intercept and determine acceptable reception and/or emission of signals.

In some embodiments, the wearable device may be customized for aesthetics and/or function by using a particular shell in combination with the body of the wearable device. The shell may include additional functionality, fashion features, design features, colors, elements, lights, materials, and/or appearances, to name a few. In one embodiment, multiple shells may be used to add functionality and/or change an appearance of the wearable device. For instance, a user may select a first shell employing additional sensors for obtaining temperature readings, pressure, and/or other measurements during a workout. Continuing this example, if the user attends a group workout, the user may attach and/or couple a second shell to the wearable device to add a functionality and/or aesthetic. In one embodiment, the second shell may amplify a communications signal sent via the wearable device. In another embodiment, the shell may be selected to provide heat retention ability (e.g., insulation) in colder climates, heat dissipation ability (e.g., cooling) in warmer climates, and/or comfort against the skin of the user (e.g., by a cloth, textile, or fiber surface in contact with the user's skin).

It is one aspect of the present invention to provide a wearable device. The wearable device generally includes, but is not limited to: (1) a body comprising a housing configured to receive a shell, a processor, a sensor, a memory to store information collected by the sensor, and a communications module to communicate with the shell; and (2) a shell comprising a housing configured to releasably interconnect to the body, a communications module configured to communicate with the body, and a display to present information collected by the sensor and stored in the memory of the body. Additionally or alternatively, a portion of the sensor may protrude at least partially from an interior surface of the shell housing proximate to skin of a user when the body is positioned on the user's wrist.

Optionally, the wearable device may further comprise a first alignment feature formed on an exterior surface of the body, and a second alignment feature formed on an interior surface of the shell, the first and second alignment features being of substantially the same size. In one embodiment, the first alignment feature protrudes from the body and the second alignment feature is recessed into the shell. Optionally, the body is substantially waterproof and devoid of external electrical inputs.

In one embodiment, the wearable device further comprises a first band interconnected to the housing of the body, the band adapted to fit a wrist of a user, and a second band interconnected to the housing of the shell. In one embodiment, the first band may be removed from the housing of the body. Optionally, the second band may be removed from the shell housing. When the shell is interconnected to the body, the second band and the shell housing cover an exterior surface of the first band and the body housing. In one embodiment, the shell is decorative. The decorative shell may be devoid of hardware and software components. In another embodiment, the first band is removed from the body. The body may then be interconnected to the decorative shell. The decorative shell may be configured to conceal the body from view. In one embodiment, the decorative shell includes a recess or chamber that receives the body after the first band is removed from the body. Continuing this example, the decorative shell, with the body in a concealed position, may be worn as a piece of jewelry. For example, in one embodiment, the decorative shell may be worn as an accessory to the users clothing, on the user's wrist, as a necklace, or in the user's hair.

In yet another embodiment, the wearable further comprises a first induction coil associated with the body, and a second induction coil associated with the shell that substantially aligns with the first induction coil when the shell is interconnected to the body. In one embodiment, when the shell is interconnected to the body, power is transferable from the second induction coil of the shell to the first induction coil of the body. Optionally, the first and second induction coils may transfer data between the body and the shell.

Another aspect of the present disclosure is a non-transitory computer readable medium having stored thereon computer-executable instructions that cause a processor of a body to execute a method of pairing the body with a shell to form a wearable device. The computer-executable instructions generally comprise: (1) an instruction to perceive a presence of the shell to the body; (2) an instruction to determine whether the shell has previously paired with the body; (3) an instruction to exchange authorization credentials with the shell; and (4) an instruction to determine a level of access to provide to the body. In some embodiments, the body includes, but is not limited to, a housing configured to receive the shell, a sensor, a memory to store information collected by the sensor, and a communications module to communication with the shell. Similarly, in embodiments, the shell generally includes, but is not limited to, a housing configured to releasably interconnect to the body, a communications module configured to communicate with the body, and a display.

Optionally, the non-transitory computer readable medium may further comprise an instruction to determine capabilities of the shell after the pairing the body with the shell. In one embodiment, the shell adds capabilities (such as, but not limited to, additional: sensors, processing power, display capabilities, battery power, communication capabilities) to the body. In another embodiment, the shell decreases the capabilities of the body, for example, by blocking or decreasing communication capabilities, blocking or covering a display, limiting or decreasing transmission of wireless transmission, or decreasing or blocking sensor readings. In another embodiment, the shell does not change the capabilities of the body and is decorative. The instructions may also include an instruction to determine whether to change a device mode in response to the pairing of the body with the shell. Additionally, in an embodiment, the instructions include an instruction to present data collected by the sensor on the display of the shell.

In one embodiment, after the pairing the processor of the body controls the display of the shell. In another embodiment, the instructions further include an instruction to determine, when the shell has not previously paired with the body, whether pairing of shell with the body is authorized. The determining of whether the pairing is authorized may optionally comprise an instruction to determine if the shell housing is in contact with the body housing for a predetermined period of time. Additionally or alternatively, the determining of whether the pairing is authorized may optionally comprise an instruction to determine if the shell and the body are in contact with a charging station.

The instructions may further comprise an instruction for the wearable device of the paired body and shell to communicate with a peripheral device. In one embodiment, the shell communication module establishes a wireless communication link with the peripheral device. In one embodiment, the peripheral device is worn by a user of the wearable device. In another embodiment, the peripheral device is associated with an article of clothing worn by the user. In still another embodiment, the peripheral device is associated with an object. In yet another embodiment, the peripheral device is associated with another person. In still another embodiment, the peripheral device is a server or a smart device, such as a smart phone.

The instructions may optionally include an instruction to provide an alert to the user of the wearable device if the communication link to the peripheral device is severed. Additionally or alternatively, the instructions may further include an instruction to provide an alert to the user of the wearable device if a distance between the wearable device and the peripheral device exceeds a predetermined amount. In another embodiment, the instructions may include an instruction to provide an alert to the user of the wearable device if the peripheral device moves out of a predetermined geographic area. Additionally or alternatively, in another embodiment, the instructions may include an instruction to provide an alert to the user of the wearable device if the peripheral device moves into a predetermined geographic area. In still another embodiment, the instructions may include an instruction to provide an alert to the user of the wearable device if the peripheral device is located in a predetermined class of locations. The predetermined class of locations may comprise approved locations and disapproved locations. For example, a school, a friend's house, a park, and certain businesses may be approved locations. Similarly, certain businesses, certain houses, and certain locations may be disapproved locations.

Optionally, in one embodiment, the wearable device controls the functions of the peripheral device. In another embodiment, the wearable device receives data from a sensor of the peripheral device. In still another embodiment, the wearable device transmits data to the peripheral device. Optionally, the instructions may further comprise an instruction for the wearable device of the paired body and shell to communicate with a wearable device worn by another user.

Additionally or alternatively, the instructions may further comprise: (1) an instruction to determine that the shell has been removed from the body; and (2) an instruction to perceive a presence of a second shell to the body. In one embodiment, the second shell is decorative and includes no components or modules. In another embodiment, the second shell has different components than the shell. Optionally, in one embodiment, the second shell is devoid of a display but includes at least a bus and a memory. Accordingly, the instructions may optionally further include: (3) an instruction to determine whether the second shell has previously paired with the body; (4) an instruction to exchange authorization credentials with the second shell; and (5) an instruction to determine a level of access to provide to the body.

Still another aspect of the present invention is a wearable device that generally comprises a body having a housing configured to receive an outer shell. The body comprises a processor, a memory, a sensor, wherein the memory is configured to store information collected from the sensor, and a communications module configured to communicate with the outer shell.

In one embodiment, the wearable device further comprises the outer shell. The outer shell may comprise a shell housing having at least one feature configured to operatively couple with the housing of the body and a shell communications module configured to communicate with the communications module of the body.

Optionally, the outer shell may comprise a second processor, a second memory, and a display configured to present a graphical user interface including at least some of the information collected by the sensor.

In an embodiment, the outer shell is configured to receive a second outer shell. The second outer shell comprises a second shell housing having at least one feature configured to operatively couple with the shell housing of the outer shell, and a second shell communications module configured to communicate with at least one of the communications module of the body and the shell communications module. The body is optionally configured to operate with or without the outer shell and/or second outer shell. In an embodiment, the outer shell is configured to increase a functionality of the body and wearable device or decrease the functionality of the body and wearable device. In another embodiment, the second outer shell is configured to increase a functionality of the body, the outer shell, and the wearable device or decrease the functionality of the body, the outer shell, and the wearable device.

By way of providing additional background, context, and to further satisfy the written description requirements of 35

U.S.C. §112, the following patents and patent publications are incorporated by reference in their entireties for the express purpose of explaining and further describing components of the wearable device and peripheral devices that may be physically or communicatively coupled to the wearable device to provide additional written description support for various aspects of the present disclosure: U.S. Pat. No. 5,931,764; U.S. Pat. No. 6,619,835; U.S. Pat. No. 7,311,665; U.S. Pat. No. 7,813,715; U.S. Pat. No. 8,185,601; U.S. Pat. No. 8,583,045; U.S. Pat. No. 8,725,842; U.S. Pat. No. 8,787,006; U.S. Pat. No. 8,838,095; U.S. Pat. No. 8,862,152; U.S. Pat. No. 8,930,605; U.S. Pat. No. 9,176,530; U.S. Pat. App. Pub. No. 2007/0152833; U.S. Pat. App. Pub. No. 2007/0287438; U.S. Pat. App. Pub. No. 2008/0057868; U.S. Pat. App. Pub. No. 2011/0081860; U.S. Pat. App. Pub. No. 2013/0158369; and U.S. Pat. App. Pub. No. 2013/0262298.

The above-described embodiments, objectives, and configurations are neither complete nor exhaustive. As will be appreciated, other embodiments of the disclosure are possible using, alone or in combination, one or more of the features set forth above or described in detail below.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together."

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The terms "communication device," "smartphone," and "mobile device," and variations thereof, as used herein, can be used interchangeably and may include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

A "communication modality" can refer to any protocol- or standard defined or specific communication session or interaction, such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1×EVDO, iDEN, GPRS, HSPDA, TDMA, UMA, UMTS, ITU-R, and 5G), global navigation satellite system (GNSS), Bluetooth™ Peanut®, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The term "module" as used herein refers to any known or later developed hardware, software, firmware, artificial intelligence, fuzzy logic, or combination of hardware and software that is capable of performing the functionality associated with that element.

The term "display" refers to a portion of a physical screen used to display the output of a computer to a user. A display can employ any of a variety of technologies, such as liquid crystal display (LED), light-emitting diode (LED), organic LED (OLED), active matrix OLED (AMOLED), super AMOLED, microelectro mechanical systems (MEMS) displays (such as Mirasol® or other interferometric display), and the like.

The term "displayed image" refers to an image produced on the display. A typical displayed image is a window or desktop. The displayed image may occupy all or a portion of the display.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can be received by sensors in three-dimensional space. Further, the gesture capture can occur in one or more areas of a screen, for example, on a touch-sensitive display or a gesture capture region. A gesture region can be on the display, where it may be referred to as a touch sensitive display, or off the display, where it may be referred to as a gesture capture area.

The term "screen," "touch screen," "touchscreen," or "touch-sensitive display" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop. The dimensions and orientation of the window may be configurable either by another module or by a user. When the window is expanded, the window can occupy substantially all of the display space on a screen or screens.

The terms "determine," "calculate," and "compute," and variations thereof, as used herein, are used interchangeably and include any type of methodology, process, mathematical operation, or technique.

It shall be understood that the term "means," as used herein, shall be given its broadest possible interpretation in accordance with 35 U.S.C., Section 112, Paragraph 6 or other applicable law. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "Bluetooth" may refer to wireless technology for exchanging data over short distances (using short-wavelength UHF radio waves in the ISM band) from fixed and mobile devices and building personal area networks (PANs). The technology may connect several devices in order for data synchronization between devices or between devices and a server.

The term "NFC" or "near field communication" may refer to technology wherein radio communication is established between two devices to allow the exchange of data.

The term "peripheral" may refer to one or more auxiliary devices (e.g., input devices, output devices, sensors, accessories, speakers, displays, etc.) that connect to and interact with a computer by either sending or receiving information.

The term "RFID" or "radio frequency identification" may refer to the wireless use of electromagnetic fields to transfer data, for the purposes of automatically identifying and tracking tags attached to objects. Such tags contain electronically stored information. Some tags are powered by electromagnetic induction from magnetic fields produced near the reader. Some types collect energy from the interrogating radio waves and act as a passive transponder.

The term "wearable" as used herein includes any wearable electronic devices that are worn by a user under, with, or on top of clothing and/or skin. For example, wearable electronic devices include electronic devices in shoes, socks, belts, wrist devices, glasses, and components of these articles, such as buttons on a shirt. This class of wearable technology has been developed for general or special purpose information technologies and media development. Wearable computers are especially useful for applications that require more complex computational support than just hardware coded logics. The wearable devices include heart rate monitors, blood pressure monitors, glucose monitors, pedometers, movement sensors, wearable computers, and/or the like. Examples of wearable computers may be worn by a user and configured to measure user activity, determine energy spent based on the measured activity, track user sleep habits, determine user oxygen levels, monitor heart rate, provide alarm functions, and more.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The accompanying drawings, which are incorporated herein and constitute a part of the specification, illustrate embodiments of the disclosure and together with the Summary of the Disclosure given above and the Detailed Description of the drawings given below serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

FIG. 1C is a side elevation view of a body of an embodiment of a wearable device of the present disclosure;

FIG. 1D is another top plan view of an exterior surface of a body of an embodiment of a wearable device of the present disclosure illustrating some of the components of the body;

FIG. 1E is a bottom plan view of an interior surface of the body of FIG. 1D;

Figure 1B:
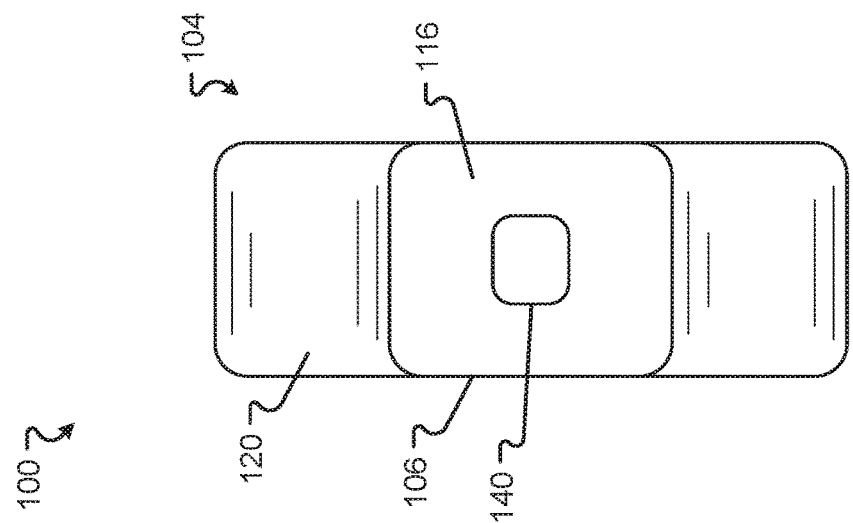
FIG. 1B is a top plan view of a body of an embodiment of a wearable device of the present disclosure.
Figure 1A:
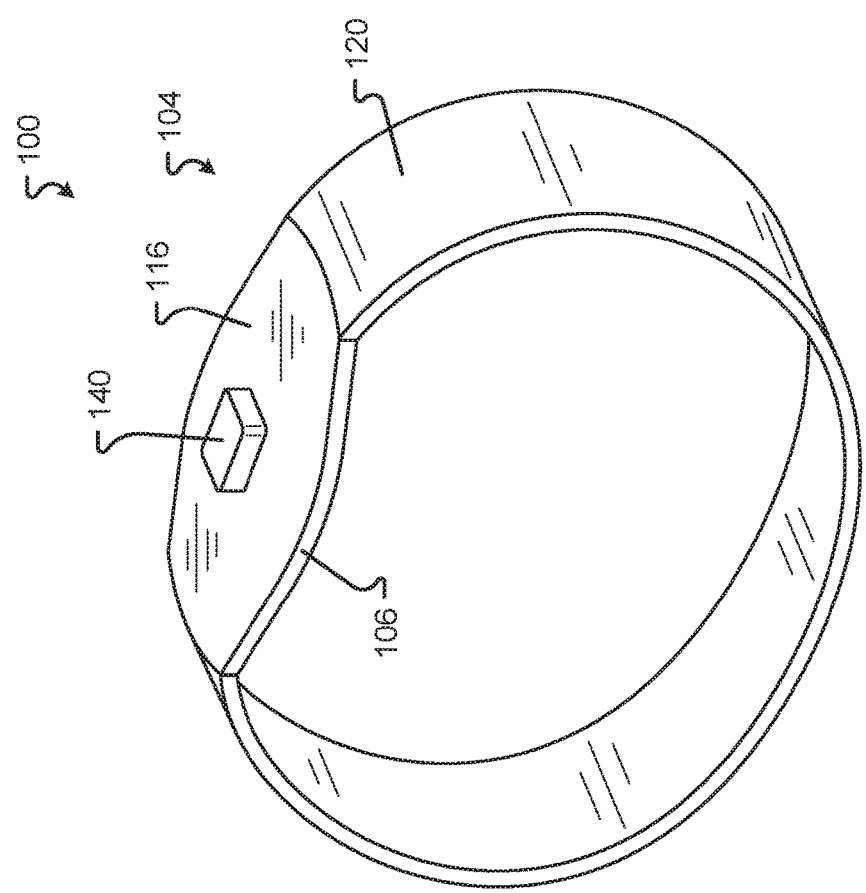
FIG. 1A is a perspective view of a body of an embodiment of a wearable device of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a complete wearable ecosystem. The ecosystem can comprise single devices or a compilation of devices. This device, or these devices, may be capable of communicating with other devices and/or to an individual or group of individuals. Further, this device, or these devices, can receive user input in unique ways. The overall design and functionality of each device provides for an enhanced user experience making the device more useful and more efficient. As described herein, the device(s) may be electrical, mechanical, electro-mechanical, software-based, and/or combinations thereof.

Referring now to FIGS. 1A-1E, various views of a body 104 of a wearable device 100 are shown in accordance with embodiments of the present disclosure. The body 104 may generally include a housing 106 and a retention element 120. In one embodiment, the retention element is a band 120. The band is adapted to fit a wrist or other area of a wearer. In one embodiment, the band 120 may be closed with a generally circular shape and a diameter 124 sufficient to fit the wearer's wrist. In one embodiment, the band 120 has a width 128. Although the housing 106 is illustrated with a width wider than the width 128 of the band, it will be appreciated that the housing may have a width equal to width 128. For example, FIG. 1G illustrates an example of a body 104A with a substantially uniform width along the band 120 and the housing 106.

Although the band 120 is illustrated having a closed or substantially circular form, it will be appreciated that the band may have a shape that is at least partially open, such as similar to a bracelet. In this manner, the user may position the body 104 on the user's wrist or ankle by at least partially bending two portions of the band 120 apart. Optionally, in another embodiment, the band 120 may have shape memory. For example, the band 120 may return to a predetermined shape after bending by a user as the band 120 is placed or removed on the user's wrist. In one embodiment, the band 120 includes a channel for orienting a shell 108. Optionally, in another embodiment, the band includes a ridge or protrusion for orienting the shell 108.

The band 120 may be made from a flexible material (e.g., rubber, polymer, plastic, leather, linked metal, etc.). The band 120 may elastically stretch over a user's hand, for example, if worn on a user's wrist, and return to a comfortable inside diameter 124 once situated on the wearable area. In another embodiment, the band 120 may be attached to a user's wrist or other area for wearing using one or more of a clasp, fastener, pin, latch, magnet, hook-and-loop fastener, tab and groove, etc.

In the various embodiments discussed herein, the body 104 can, for example, be formed by molding techniques. Molding allows electronic components 132 to be embedded in portions of the body 104. Molding also allows a desired shape of the body 104 to be formed. Various molding techniques, such as compression molding, transfer molding, injection molding, and the like, may be used to form the body 104. Some techniques that may be useful to integrate electronics into the molded part include insert molding and/or double shot injection molding.

The band 120 may optionally be integrally formed with the body 104. Alternatively, the band 120 is releasably interconnected to the body 104. In this manner, the body 104 may be used without the band. Thus, the body 104 may be positioned on or retained by a portion of a user's clothing. For example, the user may remove the band 120 and place the body 104 in a pocket or a cavity of an article of clothing, such as the user's belt. Further, the user could replace the band 120 with a different band of a different size, shape, material, or color. Continuing this example, the body 104 without the band 120 could be positioned within a shell 108 comprising a receptacle to hold the body 104. Thus, in one embodiment, the user may remove the band 120 from the body 104 before pairing a shell 108 with the body 104.

Hardware components 132 such as an optional display 110 (as well as other structures), illustrated in FIG. 1D, may be positioned in a variety of locations within the body 104, including the band 120. The components 132 may be suspended within a mold, and the material of the body 104 may be allowed to be placed around the components such that the electrical components are at least partially (and possibly fully) embedded within the portion of the body 104. Optionally, the components 132 can include one or more of a processor 204, sensors 180, memory 208, and communications modules 228, 232, etc., described in more detail in conjunction with FIG. 2. Induction coils 284 may also be arranged in a variety of locations within the body 104.

Optionally, the body 104 may generate and store data without performing analysis on the data. In this embodiment, the body 104 may transfer the collected or stored data to a shell 108 or other device for further analysis. In one embodiment, at least the display 110 of the body 104 is touch sensitive. In another embodiment, at least a portion of the exterior surface 116 of the body 104 is touch sensitive. The touch sensitive portions of the body 104 may receive user inputs to control functions of the body 104 and/or an interconnected shell 108.

The body 104 may be configured such that the components 132 are maintained in a waterproof and/or airtight area. For example, the body 104 may optionally be devoid of electronic inputs or jacks or any type of void or aperture. Additionally or alternatively, one or more sensors 180 or other components 132 may be positioned proximate to an interior surface 136 of the body 104 as illustrated in FIG. 1E. In this manner, the sensors 180 are arranged to be in contact with predetermined portions of the user's skin to sense bio-information when the body 104 is worn by a user. The sensors 180 may be configured to determine the user's heart rate, blood oxygen level, blood pressure, respiration, temperature, insulin levels, and the like. Optionally, in one embodiment, at least a portion of the interior surface 136 of one or more of the body 104 and the band 120 comprises an electrically conductive structure interconnected to the components 132 and the sensors 180. In one embodiment, the body 104 does not include a display 110.

Referring now to FIGS. 1F-1K, the shape of the body 104 may be configured to receive a shell 108 or other component. The shell 108 generally includes a housing 118 and a retention element 122. The housing 118 and retention element 122 of the shell 108 may be configured to slide over the body 104. In this manner, the shell 108 may be interconnected to the body 104 to, among other things, prevent unintended or inadvertent movement of the shell 108 with respect to the body 104.

The retention element 122 may comprise a band. Optionally, the band 122 may be removed from the body 108 and replaced with a different second band. In one embodiment, the band 122 may comprise a commercially available band adapted to fit a watch. Alternatively, the band 122 may be integrally formed with, or permanently attached to, the shell housing. In another embodiment, at least one component of the body 108, such as the components illustrated in FIG. 2B, is located within a portion of the retention element 122.

The shell 108 may be configured to provide different or additional functionality to the body 104 of the wearable device 100. Said another way, the shell 108 may provide additional memory, additional processors, additional or improved sensors (e.g., sensors that are more accurate or more sensitive), additional power, signal amplification, or comfort or aesthetic features. Optionally, the shell 108 may be adapted to decrease or prevent the transmission of wireless communication signals to or from the body 104. In one embodiment, the shell 108 includes a Faraday cage. The Faraday cage may be operable to block transmission of all wireless communication frequencies. In another embodiment, the Faraday cage is adapted to block the transmission of certain wireless communication frequencies. In yet another embodiment, the Faraday cage is adapted to block only those wireless communication frequencies associated with one or more of a cellular telephony module 228 and a wireless communication module 232, discussed in more detail in conjunction with FIG. 2A, of the body 104.

A display 114 of any size and type may be provided with the shell 108. The display 114 may be of a different type or size than the display 110 of the body 104. The body 104 can be paired with any number of different shells 108 each of which provides different functionality to a user. In one embodiment, the body 104 may be configured for all-day and/or all-night wear. Additionally or alternatively, the body 104 may be configured to operate with or without a shell 108.

In one embodiment, the shell 108 may be held in a predetermined position with respect to the body 104 by a friction fit. Optionally, one or more of the body 104 and the shell 108 may include fasteners or clasps to align and interconnect to each other. Additionally or alternatively, the body 104 and the shell 108 may include one or more features 140, 144 for alignment, registration, and/or retention. The feature 140 of the body 104 may interact with the feature 144 of the shell 108 to create a predetermined alignment between the body 104 and the shell 108. These keying and/or receiving features 140, 144 may be configured to interface, couple, and/or interconnect the shell 108 to the body 104 or other component, for example as illustrated in FIGS. 1F-1K.

Optionally, sensors may be associated with the receiving features 140, 144. In this manner, when the alignment feature 140 of the body 104 engages or interacts with the alignment feature 144 of the shell 108, the sensors may send a signal to the other components of the body 104 and the shell 108. For example, a sensor associated with the alignment feature 140 may generate a signal indicating contact with (or proximity to) the alignment feature 144. The signal may be sent by bus 220 to the processor 204 of the body. Further, the device management module 324, device state module 374, and/or the event module 384 of the body 104 may receive the signal from the sensor associated with the alignment feature 140.

The alignment features 140, 144 may comprise magnets or a mechanical catch for releasably interconnecting the shell 108 to the body 104. Additionally or alternatively, the features 140, 144 may be fixed or adjustable, and may include such elements as pins, shelves, guides, reference surfaces, keyways, and the like. The alignment features 140, 144 may also provide visual alignment clues for helping the user position the shell 108 on the body 104. In one embodiment, the body alignment feature 140 comprises a protrusion. The shell alignment feature 144 comprises a recess or groove sized to receive the feature 140. Alternatively, although not illustrated, it will be appreciated by one of skill in the art that the shell alignment feature may comprise a protrusion adapted to be received by a recess or groove formed in a portion of the body 104.

The body 104 and the shell 108 may include features for transferring data or power by wired or wireless means. For example, the body 104 may receive power from a shell 108. Alternatively, the body 104 may be configured to transfer power to the shell 108. In one embodiment, the body 104 and the shell 108 include interfaces 152 for transferring data and/or power. In another embodiment, the body 104 and the shell 108 include induction coils and resonant inductive coupling for transferring power and/or data (as one skilled in the art will understand). Examples of suitable inductive power and data systems that may be used with the body 104 and shell 108 of the present disclosure are described in U.S. Patent Application Publication No. 2013/0198867 and U.S. Patent Application Publication No. 2010/0081473 which are each incorporated herein by reference in their entirety.

In some cases, the body 104 and/or the shell 108 may further include retention mechanisms for releasably securing the shell 108 to the body 104. By way of example, the retention mechanisms may include one or more magnets, snaps, latches, catches, friction couplings, detents, tabs, slots, and/or the like. In some cases, the body 104 may even include a lock so that the shell 108 is only removable if the user has the proper key, combination or access code.

In some embodiments, the keying and/or receiving features 140, 144 may be designed with a low height, protrusion, or other low profile. In one embodiment, the features may be configured as an undulation or a valley in a portion of the body 104 and/or band 120. In some embodiments, the band 120 may include one or more optional connection points. In this case, the material of the body 104 and/or band 120 may be constructed from material that is rigid in nature, although not required. In one embodiment, the keying and/or receiving feature 140, 144 may include an inductive charging element for transmitting and/or receiving power and data.

Figure 1F:
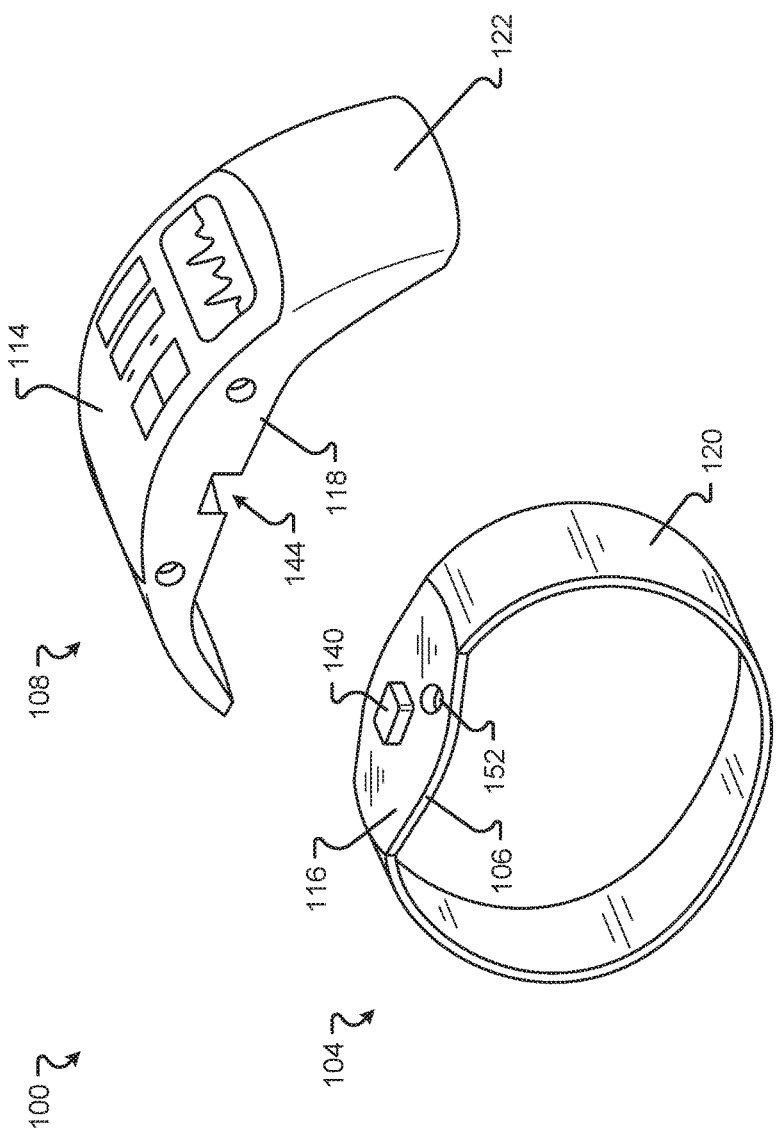
FIGS. 1F-1G are views of a body and a shell of a wearable device in accordance with embodiments of the present disclosure.
Figure 1H:
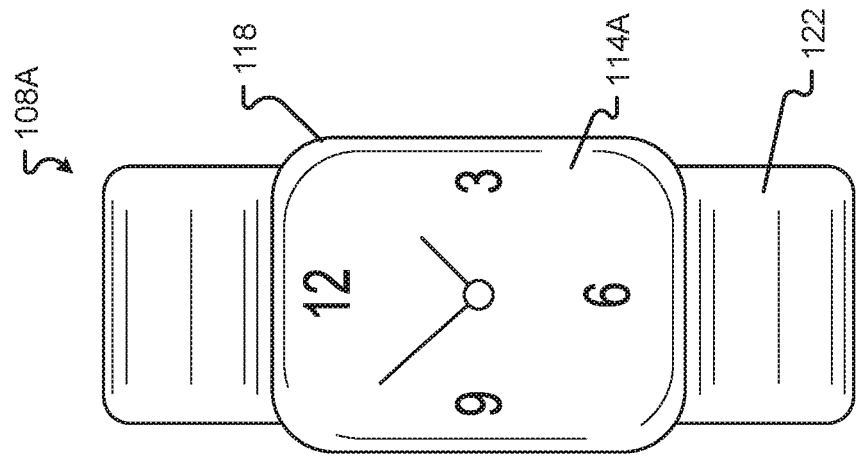
FIG. 1H is a top plan view of another shell of a wearable device in accordance with embodiments of the present disclosure.
Figure 1G:
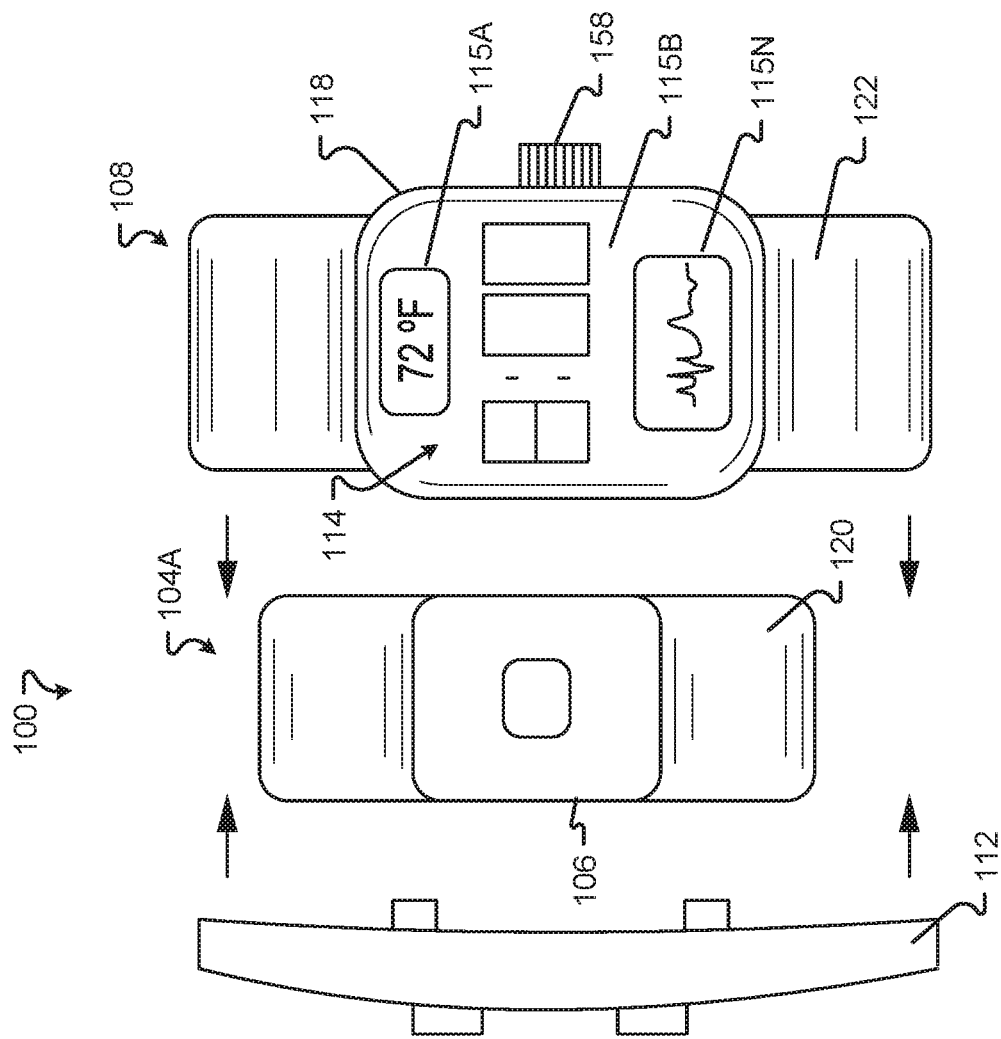

Referring now to FIGS. 1F-1G, views of a shell 108 for coupling with a body 104 of a wearable device 100 in accordance with embodiments of the present disclosure are illustrated. As shown, the shell 108 includes additional functionality (e.g., a display 114, and one or more function buttons or inputs 158, etc.).

The shell 108 may include a power supply, a driver board or components for the display 114, and/or other sensors as described in more detail in conjunction with FIG. 2B. For instance, the shell 108 may include a temperature sensor that is configured to measure an ambient or operator temperature. This sensor data may be communicated to the body 104 of the wearable device 100 via one or more wireless communications protocols (e.g., NFC, RFID, induction, Bluetooth™, etc.). In some embodiments, the body 108 may be configured to provide power to the shell 108 via a power supply of the body 104. It should be appreciated that some shells 108 may include a power supply that is configured to charge the body 104 of the wearable device 100.

In some embodiments, the shell 108 may be constructed of one or more pieces. For example, the shell 108 may be configured to encapsulate, or at least partially encapsulate, a portion of the body 104. Optionally, the band 122 may be removable from the shell housing 118. In another embodiment, the band 122 is integrally formed with the housing 118. In one embodiment, the shell 108 is configured to encapsulate substantially all or the entirety of the body 104.

An embodiment of a two-piece shell 108 is illustrated in FIGS. 1F-1G, where a shell end piece 112 connects with the shell main portion 108 around, and keyed to, the body 104 of the wearable device 100. In any event, as described herein, once connected, the shell 108 and the body 104 may communicate with one another and send and/or receive data and power to each other. For example, once connected to the body 104, the shell 108 may graphically display a heart rate from data obtained via the heart rate sensor that may be found in the body 104 on a portion of the shell display 114. Further, as illustrated in FIG. 1G, the shell display 114 may include any number of separate display portions or windows 115A, 115B . . . 115N. The display portions 115 may be configurable by the user to display any desired information. In one embodiment, the shell 108 is configured to automatically display at least some sensor data collected by the body 104 when the shell 108 is paired with the body 104. For example, as illustrated in FIG. 1G, a first display portion 115A may display temperature data collected by the body 104. The temperature data may comprise an atmospheric temperature or a body temperature of the user. Another display portion 115N may display biometric data of the user. In one embodiment, the biometric data in display portion 115N comprises a heart-rate of the user. In another embodiment, the biometric data 115N comprises a respiration rate. The heart-rate and the respiration rate may be presented graphically or numerically. Optionally, the user can chose how and where the sensor data is presented on display 114. More specifically, the user can change the arrangement, size, or number, of display portions 115. The user can also define what data is presented in display portions 115. For example, the display 114 may be configured to display temperature, time, and other information selected by the user.

As will be appreciated, any number of shells 108 may be used with the body 104. For example, another embodiment of a shell 108A is illustrated in FIG. 1H. Shell 108A may comprise different capabilities compared to shell 108. For example, shell 108A may comprise a different display 114A. Display 114A may be larger or be configured to display information in a different manner. Shell 108A may also be devoid of external buttons, such as button 158 of shell 108. It should be appreciated that a user may select a different shell optimized for a particular activity (for example, sports, hiking, swimming, and navigation) or selected for aesthetics. In one embodiment, shell 108A may comprise a decorative analog watch face and not include electronic display. The shell 108A may be devoid of processors and sensors and selected to hide or dress-up the body 104. However, although the body 104 may be substantially encapsulated by the shell 108A, the body 104 may still be collecting and storing data. Accordingly, the user may select shell 108A for use with the body 104 in a more formal environment or when the user desires to hide the capabilities or appearance of the body 104. Further, as the shell 108 may have less capability than the body 104, the shell 108 may be less expensive and, accordingly, easier for a user to replace. Additionally, in one embodiment, the shell 108 does not include a processor. In this regard, the shell 108 without a processor may rely on the processor of the body 104 to provide full functionality to the components of the shell 108. For instance, the shell 108 may require communication with the body 104 for sufficient processing power to exploit the components of the shell 108 or to facilitate wireless communication. Accordingly, the shell 108 may be made less expensive or lighter in weight.

Figure 1I:
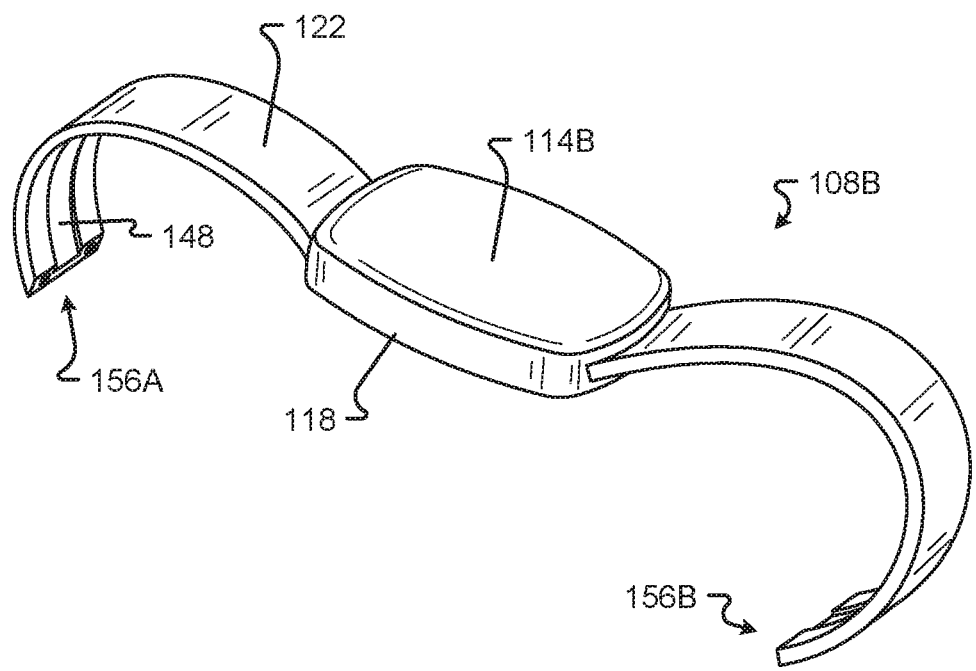
FIGS. 1I-1J are perspective views of yet another shell of a wearable device in accordance with embodiments of the present disclosure.
Figure 1J:
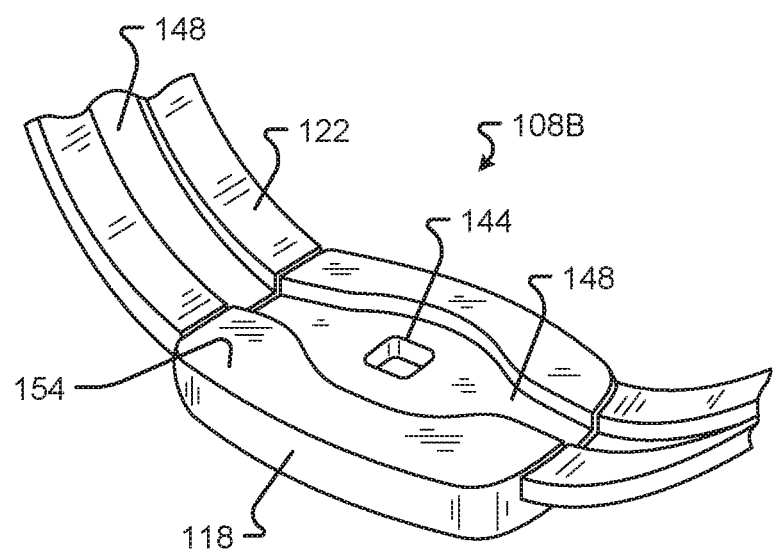

FIGS. 1I-1J show various views of another shell 108B design that is configured to cover and couple with a wearable device body 104. In one embodiment, a user may attach the shell 108B around a wearable device body 104 that is currently worn by a user. This design allows for a quick exchange of shells. For instance, a user may select a rubber shell having a simple display for workout information while exercising. Continuing this example, the user may then remove the rubber shell and replace it with a bracelet shell having a specific color and/or notification illumination features (e.g., LEDs, lights, etc.). Although the bracelet shell 108B may optionally not include a display 114B in some cases, the bracelet shell may be configured to alert the user visually (e.g., via illuminating, pulsing, or flashing, etc.) or mechanically (e.g., by providing haptic feedback, vibration, etc.) of one or more conditions. The conditions may correspond to blood sugar rating, heart rate, blood pressure, or a change in proximity or location of a paired peripheral device. The user may create rules that are stored in memory of the body 104 or shell 108 to define when and why alerts are provided.

As shown in FIG. 1J, the shell 108B may incorporate a number of features configured to receive and/or connect to a wearable device body 104. Connection may be achieved by friction fit, magnetic connection, keying, and/or using other attachment features. Optionally, a band 122 of the shell 108B may include a slot or mortise 148 formed on an interior surface 154 of the shell 108B. The slot 148 may have a width substantially equal to the width 128 of the body band 120. Said another way, the slot 148 of the shell band 122 may be sized to receive at least a portion of the band 120 of the body 104. Optionally, the slot 148 may be sized to encapsulate three exterior sides of the body band 120 but not the interior surface 136 of the body band 120. The mortise 148 may be in addition to, or instead of, the alignment feature 144. In one embodiment, the slot 148 from the band 122 continuously across the shell housing 118. Accordingly, the body housing 106 may at least partially fit into a portion of the slot 148. Opposing ends 156A, 156B of the shell band 122 may optionally include a fastener to interconnect together. The fastener may comprise magnets, snaps, latches, catches, friction couplings, detents, tabs, slots, and/or the like.

Figure 1K:
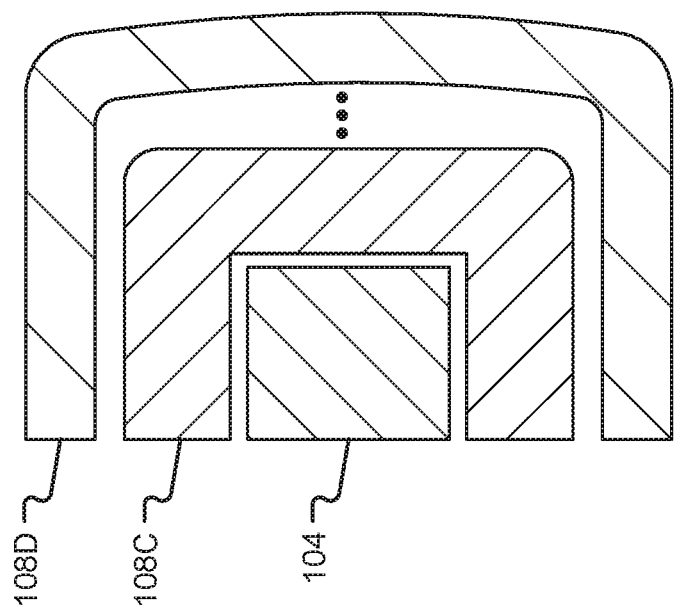
FIG. 1K is a block diagram of a body coupled with multiple shells in accordance with embodiments of the present disclosure.

Referring now to FIG. 1K, the device 100 may be configured to operate with one or more shells 108C, 108D that may be removably interconnected to a body 104. As can be appreciated each shell 108 may provide additional functionality to the functionality of the body 104 and/or the body 104 and any attached shell 108. For example, a user may couple a first shell 108C to the body 104. A second shell 108D may then be coupled to the device 100. In one embodiment, the shells 108C, 108D at least partially encapsulate the body 104. Additionally or alternatively, the outer shell 108D may provide a protective layer to the device 100. For example, shell 108D may be formed of a material that protects the body 104 and shell 108C from impact or environmental conditions, such as dirt, debris, and moisture. Accordingly, in one embodiment, the shell 108D may be interconnected to the device 100 when the user is going swimming to protect the device from exposure to water.

Although the body 104 and the shell 108 of the wearable device 100 are generally illustrated as adapted for wear on the wrist or ankle of a user, it will be appreciated that the wearable device 100 may have any form. For example, the body 104 and shell 108 may be any combination of wearable items, including broaches, rings, earrings, buttons, tie tack and clips, items worn in the user's hair, necklace, belt buckles, pins, clothing accessories, and combinations thereof.

Figure 2A:
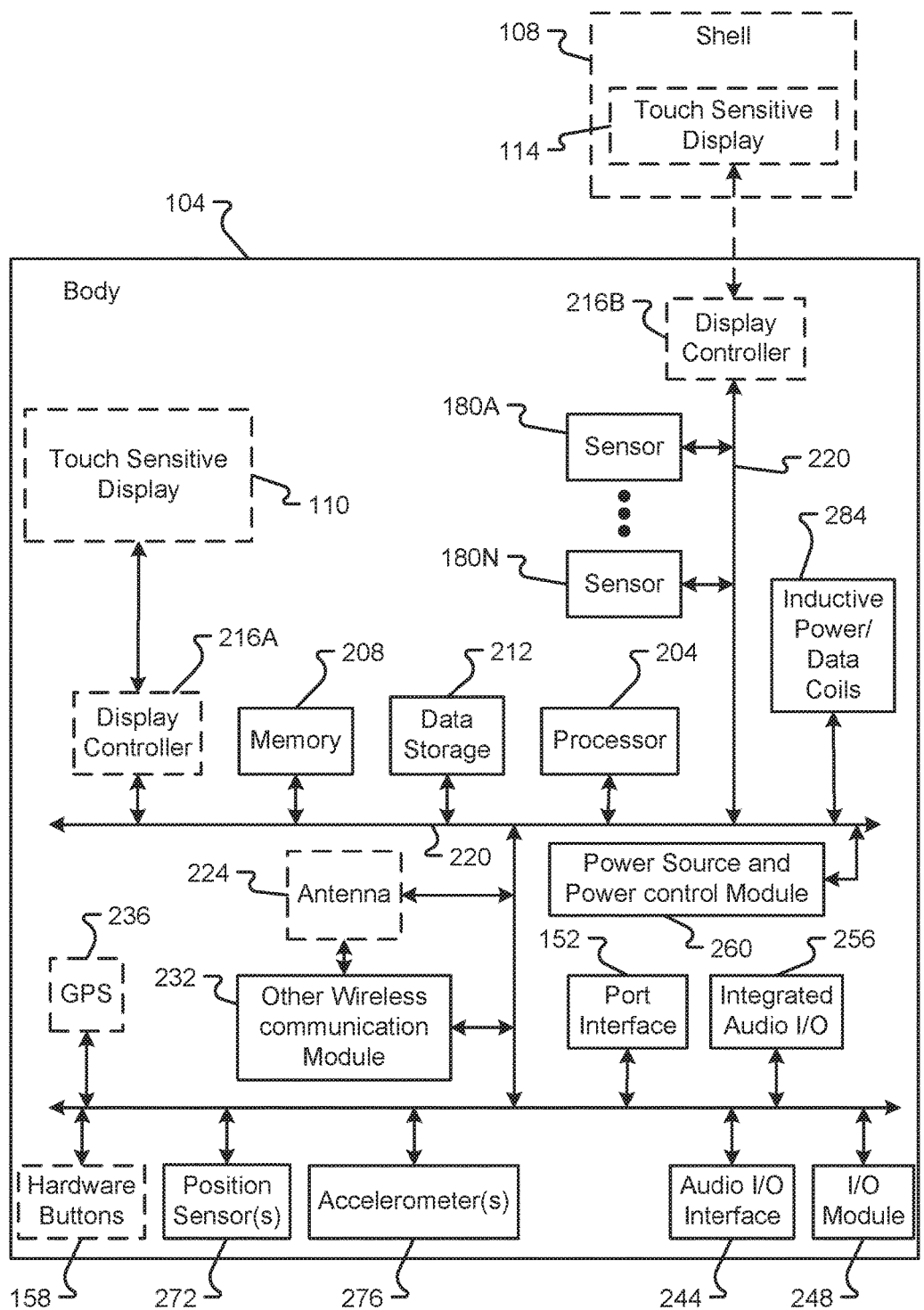
FIG. 2A is a block diagram of an embodiment of the hardware of a body of a wearable device of the present disclosure.
Figure 2B:
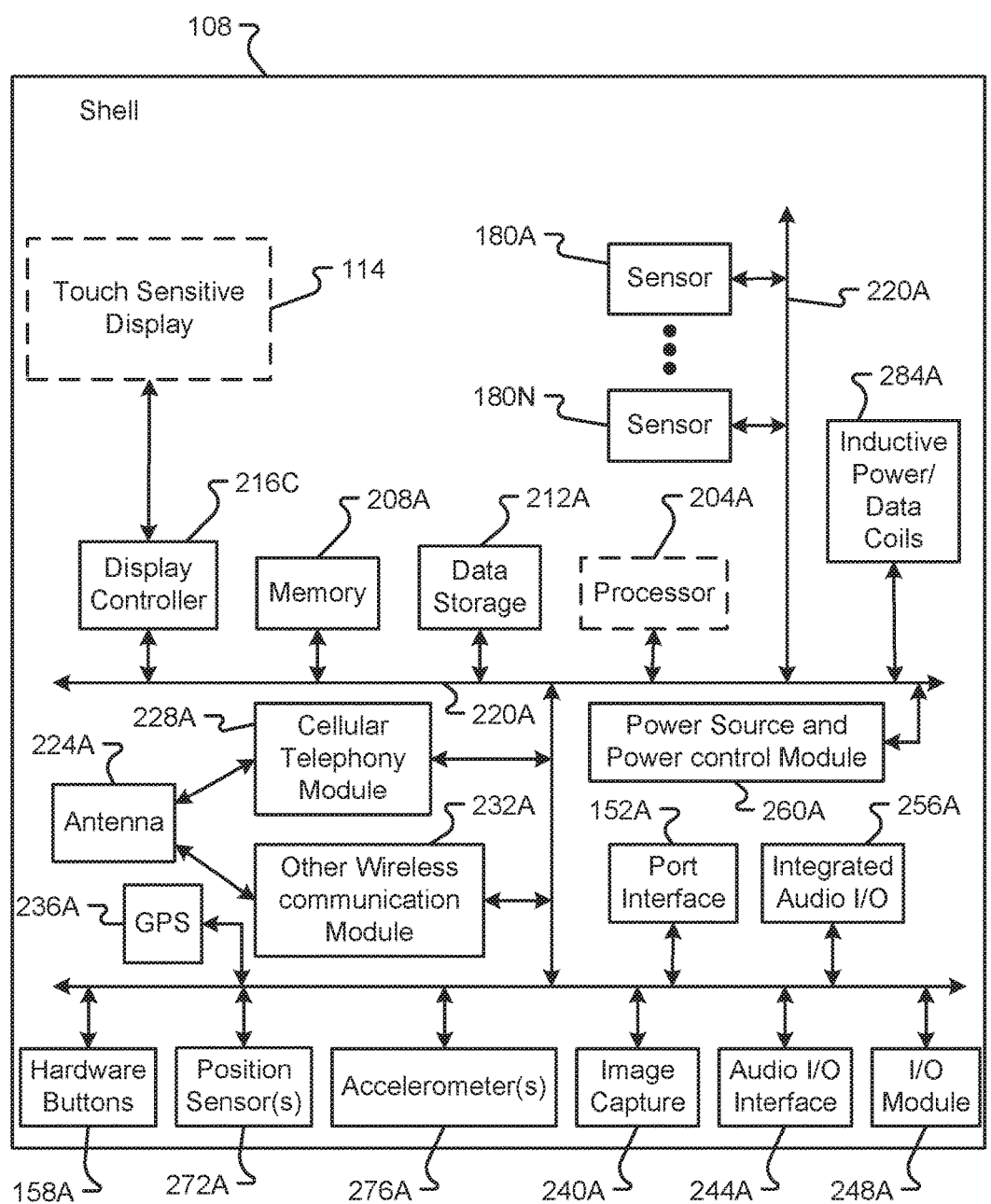
FIG. 2B is a block diagram of an embodiment of the hardware of a shell of a wearable device of the present disclosure.

FIGS. 2A and 2B illustrate components of a body 104 and a shell 108 in accordance with embodiments of the present disclosure. The body 104 and the shell 108 may include any number of electronic components, typically one or more of a processor, memory, accelerometer, gyroscope, GPS or other sensor, and a communications module as described in more detail below.

A portion of the body 104 and the shell 108 can be touch sensitive and can include different operative areas. The body 104 and shell 108 may each optionally include a touch sensitive display 110, 114. In general, the displays 110, 114 may comprise a full color, touch sensitive display. In one embodiment, the body 104 does not include a display. The displays 110 and 114 may comprise liquid crystal display devices. A capacitive input matrix may be positioned over the displays 110, 114 to receive input from the user.

One or more display controllers 216A, 216B may be provided for controlling the operation of the touch sensitive displays 110, 114, including input (touch sensing) and output (display) functions. In the exemplary embodiment illustrated in FIG. 2A, the body 104 optionally includes a first touch screen controller 216A for body display 110 and a separate second touch screen controller 216B for the shell display 114. In this manner, when the shell 108 is coupled to the body 104, the display controller 216B of the body 104 will control the display 114 of the shell 108. In accordance with alternate embodiments, a common or shared touch screen controller 216 may be used to control each of the included touch sensitive screens 104 and 108. In another embodiment, illustrated in FIG. 2B, the body 104 includes a display controller 216C operable to control the display 114. In accordance with still other embodiments, the functions of a touch screen controller 216 may be incorporated into other components, such as a processor 204. In another embodiment, the body 104 does not include a display controller.

The processor 204 of the body 104 and, optionally, the shell processor 204A may comprise a general purpose programmable processor or controller for executing application programming or instructions. In accordance with at least some embodiments, the processors 204 may include multiple processor cores, and/or implement multiple virtual processors. In accordance with still other embodiments, the processors 204 may include multiple physical processors. As a particular example, the processors 204 may comprise a specially configured application specific integrated circuit (ASIC) or other integrated circuit, a digital signal processor, a controller, a hardwired electronic or logic circuit, a programmable logic device or gate array, a special purpose computer, or the like. The processors 204 generally function to run programming code or instructions implementing various functions of the device 100. In one embodiment, the processor is a dual core processor. For example, the processor 204 may comprise an Intel Atom Z34XX processor. However, any other suitable processor may be used with the device 100 of the present disclosure. The processor 204 of the device 100 generally functions to run programming code or instructions implementing various functions of the wearable device, shell, and/or one or more peripherals. In one embodiment, the shell 108 does not include a processor. Accordingly, the processor of the body 104 provides functionality to the components of the shell 108. In another embodiment, each of the body 104 and the shell 108 include a processor 204, 204A. In this embodiment, the processor 204 of the body 104 may control the processor 204A of the shell 108. Software components and modules that may be executed by a first device to control the processor of a second device are described in U.S. Patent Application Publication No. 2013/0076594 which is incorporated by reference herein in its entirety. In one embodiment, the body 104 does not include a processor and the components of the body 104 rely on the processor 204A of the shell 108 for full functionality.

The body 104 and/or the shell 108 may also include memory 208, 208A for use in connection with the execution of application programming or instructions by the processors 204, and for the temporary or long term storage of program instructions and/or data. As examples, the memory 208 may comprise RAM, DRAM, SDRAM, or other solid state memory. Alternatively or in addition, data storage 212, 212A may be provided. Like the memory 208, the data storage 212 may comprise a solid state memory device or devices. Alternatively or in addition, the data storage 212 may comprise other random access memory.

In support of communications functions or capabilities, the shell 108 can include a cellular telephony module 228A. As examples, the cellular telephony module 228A can comprise a GSM, CDMA, FDMA and/or analog cellular telephony transceiver capable of supporting voice, multimedia and/or data transfers over a cellular network. Although not illustrated in FIG. 2A, it will be appreciated that the body 108 may also include a cellular telephony module that same as, or similar to, cellular telephony module 228A.

Alternatively or in addition, the body 104 and shell 108 can include an additional or other wireless communications module 232, 232A. As examples, the other wireless communications module 232 can comprise a Wi-Fi, Bluetooth™, WiMax, infrared, NFC, RFID, or other wireless communications link. The wireless communications module may be configured to send and/or receive data between the body 104 and the shell 108, a pairing or docking station, other wearable devices, and/or other peripheral devices. The cellular telephony module 228A and the other wireless communications module 232 can each be associated with a shared or a dedicated antenna 224, 224A.

In one embodiment, each of the body 104 and the shell 108 have a unique identifier that is stored in an on board RFID active or passive tag. The unique identifier is further stored in a memory of the body 104 and shell 108. When the body 104 and shell 108 are within a predetermined RFID range of one another, one of the devices receives, from the RFID of the other device, the unique device identifier and, from a message sent by the wireless communications module, the same device identifier. This dual authentication by the duplicative reception of the unique identifier by different signal modalities indicates that the devices are within a certain range of one another (e.g., within the RFID sensing range) and that the matching unique identifiers indicate that the device within proper spatial range is the device that is attempting to pair with the other device. This creates a type of "handshake" between the two devices that enables secure pairing.

A port interface 152, 152A may optionally be included for one or either of the body 104 and the shell 108. The port interface 152 may include proprietary or universal ports to support the interconnection of the body 104 and shell 108 to each other or to other devices or components, such as a dock, which may or may not include additional or different capabilities from those integral to the device 100. In addition to supporting an exchange of communication signals between the body 104 and the shell 108 or another device or component, the port interface 152 can support the supply of power to or from the device 100. The port interface 152 may also comprise an intelligent element that comprises a docking module for controlling communications or other interactions between the device 100 and a connected device or component.

An input/output module 248, 248A and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 244, 244A can be included to provide analog audio to an interconnected speaker or other device, and to receive analog audio input from a connected microphone or other device. As an example, the audio input/output interface/device(s) 244 may comprise an associated amplifier and analog to digital converter. Alternatively or in addition, the body 104 and/or the shell 108 can include an integrated audio input/output device 256, 256A and/or an audio jack for interconnecting an external speaker or microphone. For example, an integrated speaker and an integrated microphone can be provided, to support near talk or speaker phone operations.

Hardware buttons 158, 158A can be included for example for use in connection with certain control operations. In one embodiment, the body 104 does not include any physical hardware buttons.

The shell 108 may optionally include one or more image capture interfaces/devices 240A, such as a camera, for capturing still and/or video images. Alternatively or in addition, an image capture interface/device 240A can include a scanner or code reader. An image capture interface/device 240A can include or be associated with additional elements, such as a flash or other light source. Although not illustrated in FIG. 2A, in one embodiment the body 104 includes an image capture interface/device similar to interface/device 240A.

The body 104 and/or the shell 108 can also optionally include a global positioning system (GPS) receiver 236, 236A. It will be appreciated that the GPS receiver may be operable to receive and process position and timing signals from any other global navigation satellite system (GNSS) including without limitation the Russian GLONASS, EU Galileo, and the Chinese BeiDou and COMPASS systems. In accordance with embodiments of the present disclosure, the GPS receiver 236 may further comprise a GPS module that is capable of providing absolute location information to other components of the device 100. In one embodiment, the body 104 does not include a GPS receiver. An accelerometer(s) 276, 276A may also be included in at least one of the body 104 and the shell 108. For example, in connection with the display of information to a user and/or other functions, a signal from the accelerometer 276 can be used to determine an orientation and/or format in which to display that information to the user.

Embodiments of the present disclosure can also include one or more position sensor(s) 272, 272A. The position sensor 272 can provide a signal indicating the position of the body 104 and shell 108 relative to one another. This information can be provided as an input, for example to a user interface application, to determine an operating mode, characteristics of the touch sensitive displays 110, 114, and/or other device 100 operations. As examples, position sensor 272 can comprise a series of Hall effect sensors, a multiple position switch, an optical switch, a Wheatstone bridge, a potentiometer, or other arrangement capable of providing a signal indicating of multiple relative positions the touch screens are in.

The body 104 and the shell 108 may optionally include any number of sensors 180A 180N. The sensors may be arranged in a variety of locations. For example, as illustrated in FIG. 1E, the body 104 may include sensors 180 arranged to contact the user's skin. The sensors may comprise gyroscopic sensors, heart rate monitors, temperature sensors, glucose sensors, blood oxygen sensors, or any other desired sensor. Information from the sensors may be collected and stored in the memory. The sensors may include proximity sensors that detect the presence or proximity of a shell 108 in proximity to the housing 106 of the body 104. The shell 108 may also include proximity sensors to detect the presence or proximity of the body 104. The sensors may also include contract sensors that provide signals to the body 104 and the shell 108 when the housings 106, 118 contact each other.

Sample rate for the data collected by the sensors may be set or adjusted by a user. The sample rate may also be altered based on a mode of the wearable device 100 automatically determined based on a change of shell 108. For example, a first shell 108 may cause the wearable device 100 to enter a first mode and collect certain sensor data at a first rate that is retained for a first predetermined period. A second shell 108 may cause the wearable device 100 to enter a second mode in which data is collected at a different second rate and retained for a different second predetermined period. The sensor data collected in one of the first and second modes may have priority over data collected in the other mode. The sensor data with priority may overwrite the sensor data without priority if necessary to prevent loss of the priority sensor data. In some embodiments, the sensor data may be forwarded to a central repository, another device, and/or to another computer.

The body 104 and shell 108 may also include inductive power and data coils 284, 284A. In this manner, the body 104 and shell 108 may exchange power and data inductively as described above. Further, the body 104 and shell 108 of the wearable device 100 may receive power and data inductively from a docking station as described hereinafter with FIG. 4.

Communications between various components of the body 104 and the shell 108 can be carried by one or more buses 220, 220A. In addition, power can be supplied to the components of the body 104 or shell 108 from a power source and/or power control module 260, 260A. The power control module 260 can, for example, include a battery, an AC to DC converter, power control logic, and/or ports for interconnecting the body 104 or the shell 108 to an external source of power. In some embodiments, the wearable device 100 may include a capacitive power source, such as a capacitive battery. Capacitive batteries can allow for quick charging and a low profile design. Additionally or alternatively, the body 104 and/or the shell 108 may receive power from a dock. For example, in one embodiment, the device 100 may be associated with a dock that supplies power to the body 104 and/or the shell 108. In one embodiment, the dock includes inductive coils to wirelessly supply the power to at least one of the body 104 and the shell 108.

In one embodiment, the components of the shell 108 are controlled by the body 104 when the shell 108 is interconnected to the body 104. In another embodiment, the body 104 includes fewer or different components than the shell 108. For example, in one embodiment the body 104 may comprise only a power supply 260, memory 208, a processor 204, and a wireless communication module 232 or inductive power/coils 284 to communicate with a shell 108. Accordingly, the body 104 may rely on components of the shell 108 for communication with other devices and to collect data.

Figure 3A:
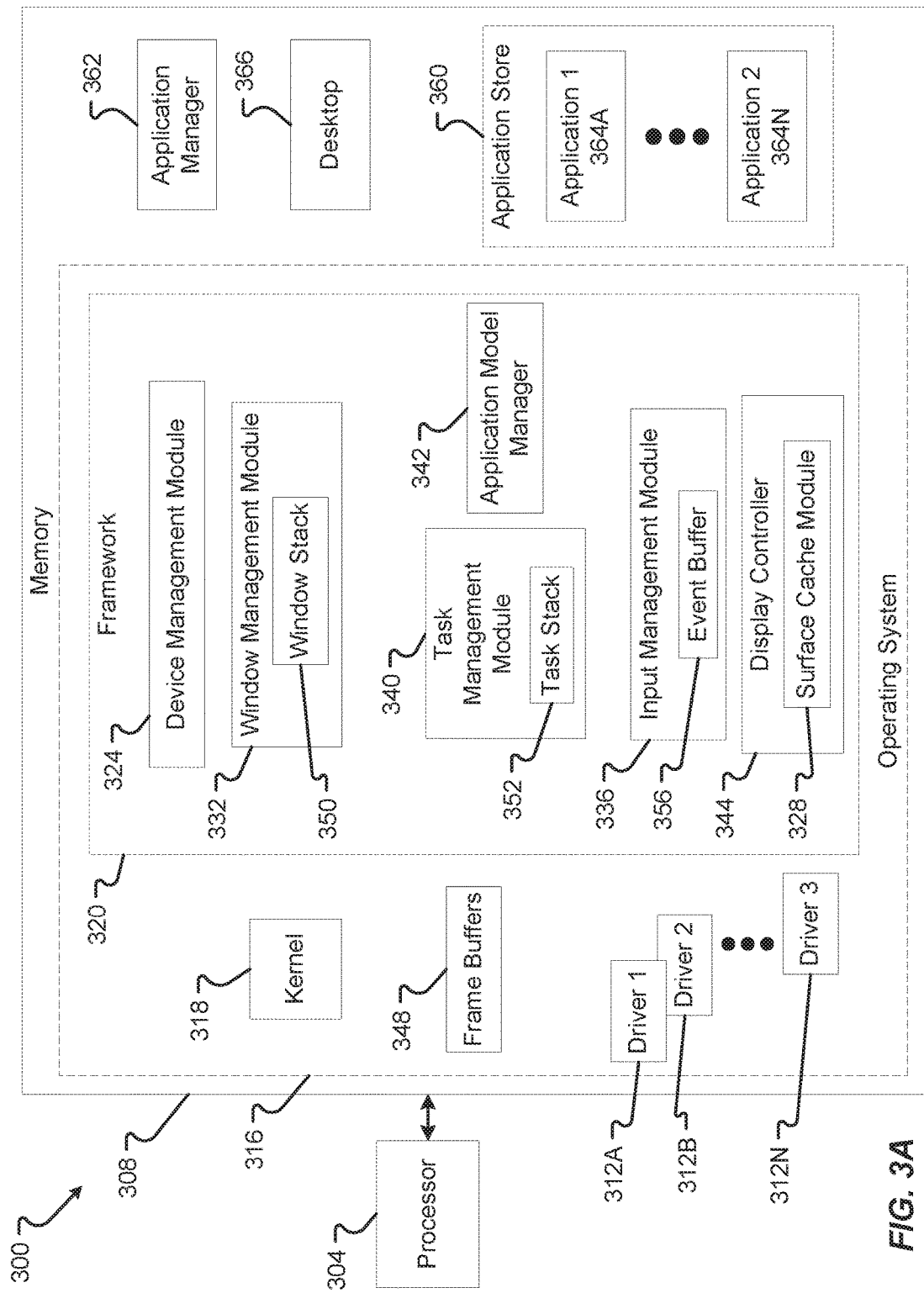
FIG. 3A is a block diagram of an embodiment of the wearable device software and/or firmware.
Figure 3B:
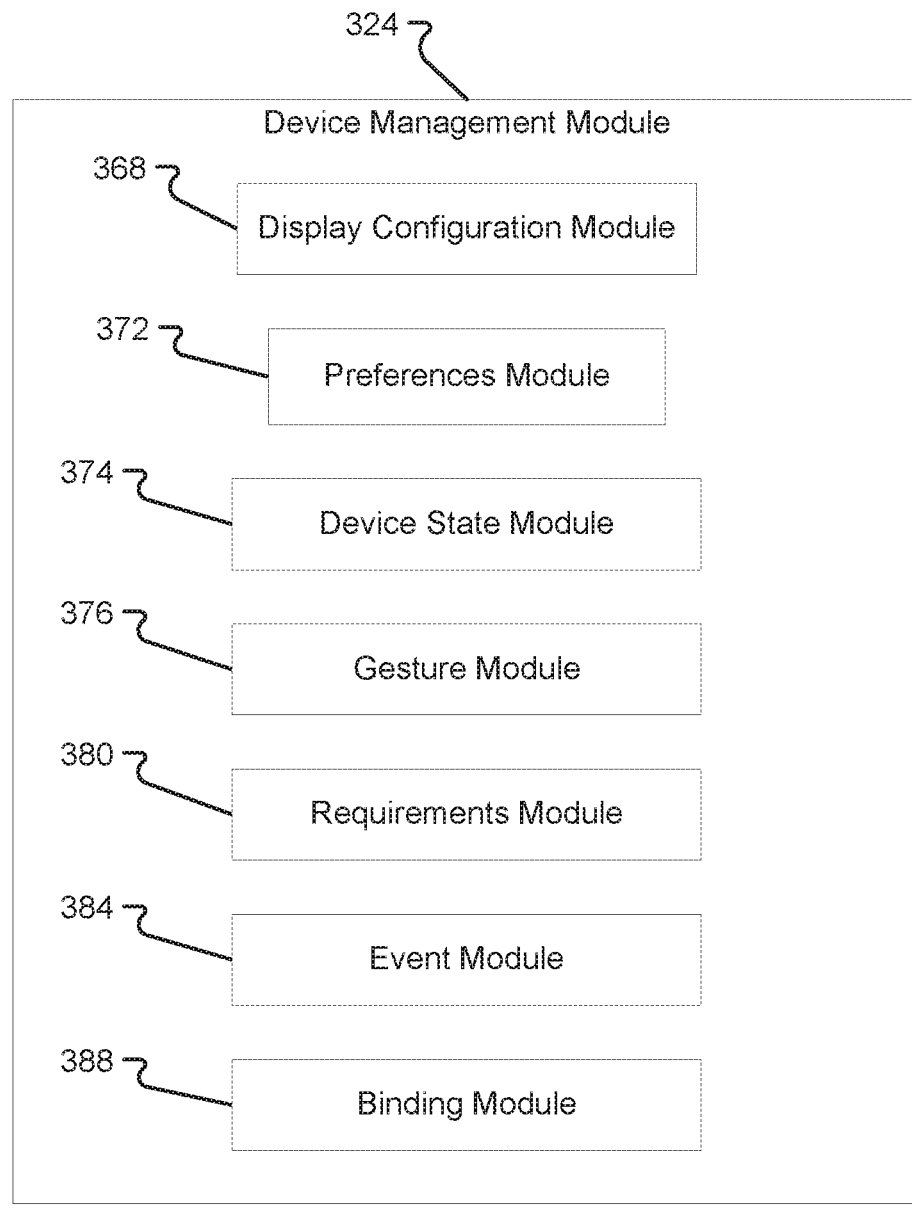
FIG. 3B is a second block diagram of an embodiment of the wearable device software and/or firmware.

Referring now to FIGS. 3A, 3B, firmware and software components 300 of the body 104 and shell 108 are illustrated. The memory 308 may store and the processor 304 may execute one or more software components. These components can include at least one operating system (OS) 316, an application manager 362, a desktop 366, and/or one or more applications 364A . . . 364N from an application store 360. The OS 316 can include a framework 320, one or more frame buffers 348, one or more drivers 312A . . . 312N, and/or a kernel 318. The OS 316 can be any software, consisting of programs and data, which manages computer hardware resources and provides common services for the execution of various applications 364. The OS 316 can be any operating system and, at least in some embodiments, dedicated to mobile devices, including, but not limited to, Linux, ANDROID™, iPhone OS (IOS™), WINDOWS PHONE 7™, etc. The OS 316 is operable to provide functionality to the body 104 and shell 108 by executing one or more operations, as described herein.

The applications 364 can be any higher level software that executes particular functionality for the user. Applications 364 can include programs such as email clients, web browsers, texting applications, games, media players, office suites, etc. The applications 364 can be stored in an application store 360, which may represent any memory or data storage, and the management software associated therewith, for storing the applications 364. Once executed, the applications 364 may be run in a different area of memory 308.

The framework 320 may be any software or data that allows the multiple tasks running on the body 104 and the shell 108 to interact. In embodiments, at least portions of the framework 320 and the discrete components described hereinafter may be considered part of the OS 316 or an application 364. However, these portions will be described as part of the framework 320, but those components are not so limited. The framework 320 can include, but is not limited to, a Device Management (DM) module 324, a Surface Cache module 328, a Window Management module 332, an Input Management module 336, a Task Management module 340, an Application Model Manager 342, a Display Controller 344, one or more frame buffers 348, a task stack 352, one or more window stacks 350 (which is a logical arrangement of windows and/or desktops in a display area), and/or an event buffer 356.

The DM module 324 includes one or more modules that are operable to manage the display of applications or other data on the displays of the device as well as the pairing of a body 104 and a shell 108. For example, in one embodiment, the DM module of the body 104 is operable to manage the body display 110 and, when present, the shell display 114. In another embodiment, the DM module of one or more of the body 104 and the shell 108 are operable to manage the pairing of a body 104 and a shell 108. An embodiment of the DM module 324 is described in conjunction with FIG. 3B. In embodiments, the DM module 324 receives inputs from the other OS 316 components, such as, the drivers 312, sensors 180, and from the applications 364 to determine continually the state of the device 100. The inputs assist the DM module 324 in determining if the pairing of a body 104 and a shell 108 is authorized as well as how to configure and allocate the displays 110, 114 of a body 104 and a shell 108, and the user's actions. Once a determination for display configurations is made, the DM module 324 can bind the applications 364 to a display. The configuration may then be provided to one or more other components to generate a window with a display.

The Surface Cache module 328 includes any memory or storage and the software associated therewith to store or cache one or more images of windows. A series of active and/or non-active windows (or other display objects, such as, a desktop display) can be associated with each display 110, 114. An active window (or other display object) is currently displayed. A non-active windows (or other display objects) were opened and, at some time, displayed but are now not displayed. The Surface Cache module 328 may be operable to store a bitmap of the last active image of a window (or other display object) not currently displayed. Thus, the Surface Cache module 328 stores the images of non-active windows (or other display objects) in a data store.

In embodiments, the Window Management module 332 is operable to manage the windows (or other display objects) that are active or not active on each or either of the displays 110, 114. The Window Management module 332, based on information from the DM module 324, the OS 316, or other components, determines when a window (or other display object) is visible or not active. The Window Management module 332 may then put a non-visible window (or other display object) in a "not active state" and, in conjunction with the Task Management module Task Management 340 suspends the application's operation. Further, the Window Management module 332 may assign, through collaborative interaction with the DM module 324, a display identifier to the window (or other display object) or manage one or more other items of data associated with the window (or other display object). The Window Management module 332 may also provide the stored information to the application 364, the Task Management module 340, or other components interacting with or associated with the window (or other display object). The Window Management module 332 can also associate an input task with a window based on window focus and display coordinates within the motion space.

The Input Management module 336 is operable to manage events that occur with the body 104 and/or the shell 108. An event is any input into the window environment, for example, a user interface interactions with a user. When the shell 108 is interconnected to the body 104, the user interaction may be received by the shell display 114. The Input Management module 336 receives the events and logically stores the events in an event buffer 356. Events can include such user interface interactions as a "down event," which occurs when a display 110, 114 receives a touch signal from a user, a "move event," which occurs when the display 110, 114 determines that a user's finger is moving across a screen(s), an "up event," which occurs when the display 110, 114 determines that the user has stopped touching the display 110, 114, etc. These events are received, stored, and forwarded to other modules by the Input Management module 336. The Input Management module 336 may also map screen inputs to a motion space which is the culmination of all physical and virtual display available on the device. The motion space is a virtualized space that includes all touch sensitive displays 110, 114 "tiled" together to mimic the physical dimensions of all of the displays. The motion space may be as described in U.S. Pat. No. 8,810,533, entitled "Systems and Methods for Receiving Gesture Inputs Spanning Multiple Input Devices," which is hereby incorporated by reference in its entirety for all that it teaches and for all purposes.

A task can be an application and a sub-task can be an application component that provides a window with which users can interact to do something, such as dial the phone, take a photo, send an email, or view a map. Each task may be given a window in which to draw a user interface. The window typically fills a display (for example, touch sensitive display 110, 114), but may be smaller than the display 110, 114 and float on top of other windows. An application usually consists of multiple sub-tasks that are loosely bound to each other. Typically, one task in an application is specified as the "main" task, which is presented to the user when launching the application for the first time. Each task can then start another task or sub-task to perform different actions.

The Task Management module 340 is operable to manage the operation of one or more applications 364 that may be executed by the device 100. Thus, the Task Management module 340 can receive signals to launch, suspend, terminate, etc. an application or application sub-tasks stored in the application store 360. The Task Management module 340 may then instantiate one or more tasks or sub-tasks of the application 364 to begin operation of the application 364. Further, the Task Management Module 340 may launch, suspend, or terminate a task or sub-task as a result of user input or as a result of a signal from a collaborating framework 320 component. The Task Management Module 340 is responsible for managing the lifecycle of applications (tasks and sub-task) from when the application is launched to when the application is terminated.

The processing of the Task Management Module 340 is facilitated by a task stack 352, which is a logical structure associated with the Task Management Module 340. The task stack 352 maintains the state of all tasks and sub-tasks on the device 100. When some component of the operating system 316 requires a task or sub-task to transition in its lifecycle, the OS 316 component can notify the Task Management Module 340. The Task Management Module 340 may then locate the task or sub-task, using identification information, in the task stack 352, and send a signal to the task or sub-task indicating what kind of lifecycle transition the task needs to execute. Informing the task or sub-task of the transition allows the task or sub-task to prepare for the lifecycle state transition. The Task Management Module 340 can then execute the state transition for the task or sub-task. In embodiments, the state transition may entail triggering the OS kernel 318 to terminate the task when termination is required.

Further, the Task Management module 340 may suspend the application 364 based on information from the Window Management Module 332. Suspending the application 364 may maintain application data in memory but may limit or stop the application 364 from rendering a window or user interface. Once the application becomes active again, the Task Management module 340 can again trigger the application to render its user interface. In embodiments, if a task is suspended, the task may save the task's state in case the task is terminated. In the suspended state, the application task may not receive input because the application window is not visible to the user.

The frame buffer 348 is a logical structure(s) used to render the user interface. The frame buffer 348 can be created and destroyed by the OS kernel 318. However, the Display Controller 344 can write the image data, for the visible windows, into the frame buffer 348. A frame buffer 348 can be associated with one screen or multiple screens. The association of a frame buffer 348 with a screen can be controlled dynamically by interaction with the OS kernel 318. A composite display may be created by associating multiple displays 110, 114 with a single frame buffer 348. Graphical data used to render an application's window user interface may then be written to the single frame buffer 348, for the composite display, which is output to multiple displays 110, 114. The Display Controller 344 can direct an application's user interface to a portion of the frame buffer 348 that is mapped to a particular display 110, 114, thus, displaying the user interface on only one of the body 104 or the shell 108. The Display Controller 344 can extend the control over user interfaces to multiple applications, controlling the user interfaces for as many displays 110, 114 as are associated with a frame buffer 348 or a portion thereof. This approach compensates for the multiple components of the device (the body 104 and the shell 108) that are in use by the software component above the Display Controller 344.

The Application Manager 362 is an application that provides a presentation layer for the window environment. Thus, the Application Manager 362 provides the graphical model for rendering by the Task Management Module 340. Likewise, the Desktop 366 provides the presentation layer for the Application Store 360. Thus, the desktop provides a graphical model of a surface having selectable application icons for the Applications 364 in the Application Store 360 that can be provided to the Window Management Module 356 for rendering.

Further, the framework can include an Application Model Manager (AMM) 342. The Application Manager 362 may interface with the AMM 342. In embodiments, the AMM 342 receives state change information from the body 104 and/or the shell 108 regarding the state of applications (which are running or suspended). The AMM 342 can associate bit map images from the Surface Cache Module 328 to the tasks that are alive (running or suspended). Further, the AMM 342 can convert the logical window stack maintained in the Task Manager Module 340 to a linear ("film strip" or "deck of cards") organization that the user perceives when sorting through the windows. Further, the AMM 342 may provide a list of executing applications to the Application Manager 362.

An embodiment of the DM module 324 is shown in FIG. 3B. The DM module 324 is operable to determine the state of the environment for the device, including, but not limited to, the orientation of the body 104, whether a shell 108 is interconnected to or paired with the body 104, the capabilities and size of a shell display 114, whether the wearable device 100 is in communication with an external display, what applications 364 are executing, how the applications 364 are to be displayed, what actions the user is conducting, the tasks being displayed, etc. To configure the displays 110, 114 and, optionally, an external display, the DM module 324 interprets these environmental factors and determines a display configuration. Then, the DM module 324 can bind the applications 364 or other device components to the displays. The configuration may then be sent to the Display Controller 344 and/or the other components within the OS 316 to generate the display. The DM module 324 can include one or more of, but is not limited to, a Display Configuration Module 368, a Preferences Module 372, a Device State Module 374, a Gesture Module 376, a Requirements Module 380, an Event Module 384, and/or a Binding Module 388.

The Display Configuration Module 368 determines the layout for the display. In embodiments, the Display Configuration Module 368 can determine the environmental factors. The environmental factors may be received from one or more other DM modules 324 or from other sources. The Display Configuration Module 368 can then determine from the list of factors the best configuration for the display. Some embodiments of the possible configurations include the body 104 operating by itself such that only the body display 110 is available, a shell display 114 and a body display 110 are both available (or visible) for display, only the shell display 114 available, and other displays, such as associated with a peripheral device, are available for display.

The Preferences Module 372 is operable to determine display preferences for an application 364 or other component. For example, an application can have a preference for Single or Dual displays, display size, display resolution, etc. The Preferences Module 372 can determine an application's display preference (e.g., by inspecting the application's preference settings) and may allow the application 364 to change to a mode (e.g., single screen, dual screen, display resolution, display size, etc.) if the device 100 is in a state that can accommodate the preferred mode. However, some user interface policies may disallow a mode even if the mode is available. As the configuration of the device changes, the preferences may be reviewed to determine if a better display configuration can be achieved for an application 364.

The Device State Module 374 is operable to determine or receive the state of the device 100 including whether a shell 108 is interconnected to a body 104, the capabilities of the shell 108 and the body 104, an activity associated with the shell 108, among others. For example, when an aerobic activity shell 108 is interconnected to the body 104, the Device State Module 374 can automatically place the wearable device 100 in a workout mode and direct the sensors to collect information such as heart-rate, respiration rate, and the like of the user. The state of the device can be used by the Display Configuration Module 368 to determine the configuration for the display. As such, the Device State Module 374 may receive inputs and interpret the state of the device. The state information is then provided to the Display Configuration Module 368. In this manner, when the aerobic activity shell 108 is interconnected to the body 104, the Display Configuration Module 368 may configure the display 114 to display related aerobic data of the user, such as the collected heart-rate, respiration rate, and the like. Further, the Display Configuration Module 368 can create display portions 115A, 115B, . . . 115N, such as illustrated in FIG. 1G, to display different sensor data.

The Gesture Module 376 is shown as part of the DM module 324, but, in embodiments, the Gesture module 376 may be a separate Framework 320 component that is separate from the DM module 324. In embodiments, the Gesture Module 376 is operable to determine if the user is conducting any actions on any part of the user interface. The Gesture Module 376 can receive touch events that occur on the displays 110, 114 (or possibly other user interface areas) by way of the Input Management Module 336 and may interpret the touch events (using direction, speed, distance, duration, and various other parameters) to determine what kind of gesture the user is performing. When a gesture is interpreted, the Gesture Module 376 can initiate the processing of the gesture and, by collaborating with other Framework 320 components, can manage the required window animation. The Gesture Module 376 collaborates with the Application Model Manager 342 to collect state information with respect to which applications are running (active or paused) and the order in which applications must appear when a user gesture is performed. The Gesture Module 376 may also receive references to bitmaps (from the Surface Cache Module 328) and live windows so that when a gesture occurs it can instruct the Display Controller 344 how to move the window(s) across the displays 110, 114.

Further, the Gesture Module 376 can receive task information either from the Task Manage Module 340 or the Input Management module 336. For example, moving a window causes the display to render a series of display frames that illustrate the window moving. The gesture associated with such user interface interaction can be received and interpreted by the Gesture Module 376. The information about the user gesture is then sent to the Task Management Module 340 to modify the display binding of the task.

The Requirements Module 380, similar to the Preferences Module 372, is operable to determine display requirements for an application 364 or other component. An application can have a set display requirement that must be observed. Some applications require a particular display orientation or a particular size display. For example, one shell 108 may have a display with a large enough display 114 for a particular application. However, a second shell 108 may have a smaller display that is not capable of displaying the application. These types of display requirement can be determined or received, by the Requirements Module 380. As different shells are added, or removed from, the body 104, the Requirements Module 380 can reassert the display requirements for the application 364. The Display Configuration Module 368 can generate a display configuration that is in accordance with the application display requirements, as provided by the Requirements Module 380.

The Event Module 384, similar to the Gesture Module 376, is operable to determine one or more events occurring with an application or other component that can affect the user interface. Thus, the Event Module 384 can receive event information either from the event buffer 356 or the Task Management module 340. These events can change how the tasks are bound to the displays. The Event Module 384 can collect state change information from other Framework 320 components and act upon that state change information. In an example, when a shell 108 is interconnected to the body 104, a message may be rendered in the shell display 114. The state change based on the event can be received and interpreted by the Event Module 384. The information about the events then may be sent to the Display Configuration Module 368 to modify the configuration of the display.

In one embodiment, each of the body 104 and the shell 108 can maintain a list of pairing identifiers for other devices that is stored in memory. When the Event Module 384 receives information that one or more of a body 104, a shell 108, and a peripheral device 400 is available for pairing, the event module 384 can determine if the other available device has previously paired with the body 104 or the shell 108. The identifiers on the list can come from prior user assisted pairing, automatic pairing by one of the techniques discussed herein, or from prior wire connected signal exchanges between the devices. In this manner, after a body 104 or shell 108 has paired with another body 104 or shell 108 or peripheral device, the event module may allow automatic re-pairing with the other body 104, shell 108, or peripheral device. The list may include a white list of devices the body 104 or shell 108 is permitted to pair with. The list may also include a black list of devices the body 104 or shell 108 is prohibited from pairing with. Alternatively, if the identifier of the other body 104, shell 108, or peripheral device is not in the list of identifiers, or is in the list of identifiers but was previously blocked from pairing with the shell 108 or the body 104, the shell 108 or the body 104 may not automatically allow re-pairing. Instead, the event module 384 may provide a query to the user to determine if the user wants to allow pairing with the other body 104, shell 108, or peripheral device.

The Binding Module 388 is operable to bind the applications 364 or the other components to the configuration determined by the Display Configuration Module 368. A binding associates, in memory, the display configuration for each application with the display and mode of the application. Thus, the Binding Module 388 can associate an application with a display configuration for the application (e.g. landscape, portrait, multi-screen, etc.). Then, the Binding Module 388 may assign a display identifier to the display. The display identifier associated the application with a particular display of the device 100. This binding is then stored and provided to the Display Controller 344, the other components of the OS 316, or other components to properly render the display. The binding is dynamic and can change or be updated based on configuration changes associated with events, gestures, state changes, application preferences or requirements, etc.

Figure 3C:
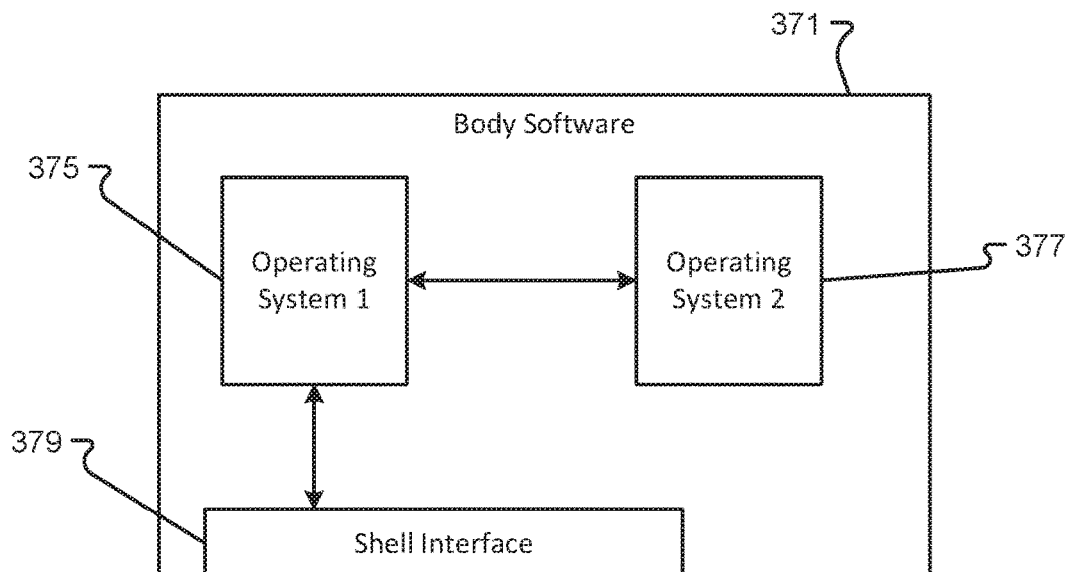
FIG. 3C is a block diagram of an embodiment of software and modules associated with the body of the wearable device.
Figure 3D:
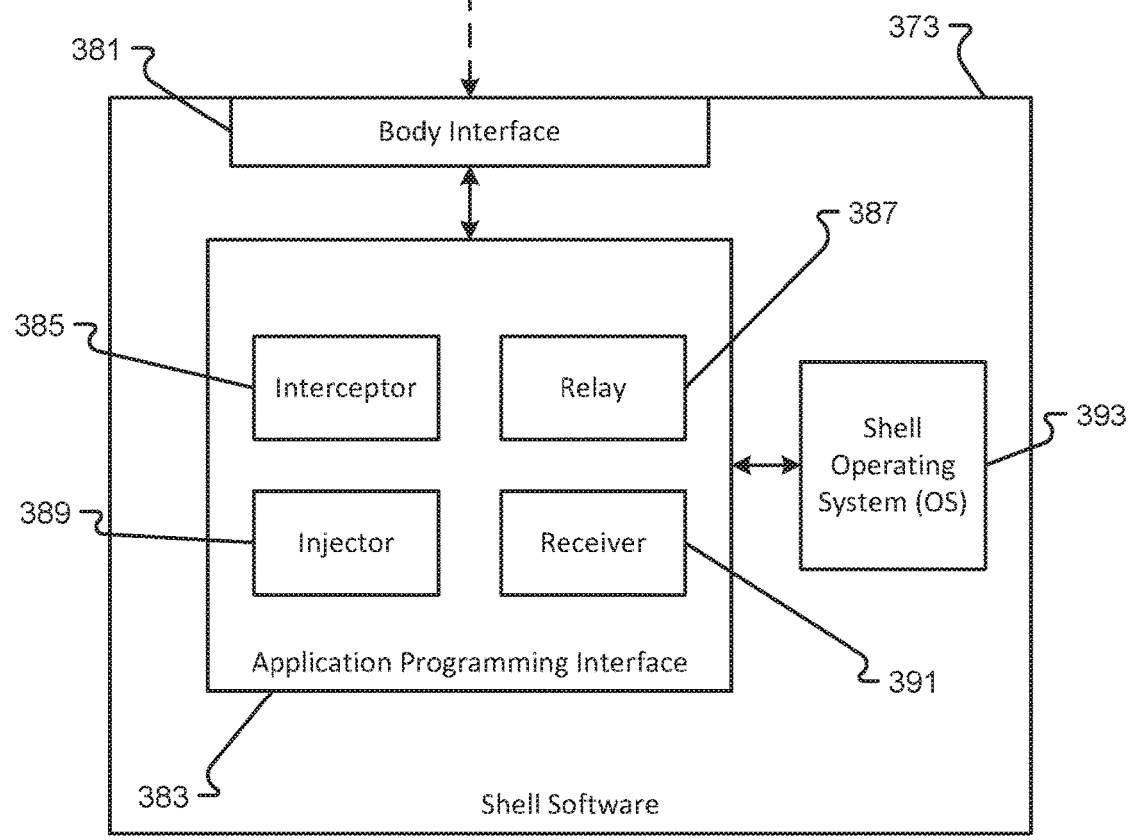
FIG. 3D is a block diagram of an embodiment of software and modules associated with the shell of the wearable device.

Embodiments of systems 371, 373 for pairing the body 104 and shell 108 to create the wearable device 100 are shown in FIGS. 3C and 3D. The software components or modules that provide for the wearable device 100 on a shell 108 are shown in FIG. 3D. The systems 371 and/or 373 for the body 104 and the shell 108 may be stored and executed in hardware as described herein. The software modules can include a first operating system 375 and a second operating system 377 included in the software of the body 104. The two operating systems 375, 377 may interact to create and manage the wearable device 100. In embodiments, the second operating system 377 may control the functions of the body 104. The first operating system 375 may control or direct the operations of the shell 108 after the body 104 and shell 108 are paired to form the wearable device 100. Thus, the first operating system 375 may communicate with a shell interface 379 that sends signals to the shell 108. In one embodiment, the signal between the body 104 and the shell 108 are communicated through the wireless communication modules 232, 232A or induction coils 284, 284A of the body 104 and the shell 108. Embodiments of the dual operating system are described in U.S. Provisional Patent Applications 61/507,199, filed Jul. 13, 2011, entitled "Dockable Mobile Software Architecture," 61/507,201, filed Jul. 13, 2011, entitled "Cross-environment communication framework," 61/507,203, filed Jul. 13, 2011, entitled "Multi-operating system," 61/507,206, filed Jul. 13, 2011, entitled "Auto-configuration of a docked system in a multi-OS environment," and 61/507,209, filed Jul. 13, 2011, entitled "Auto-waking of a suspended secondary OS in a dockable system".

The modules 373 on the shell 108 may be installed or stored upon the first pairing of the shell 108 to the body 104. Alternatively, the modules may be preinstalled on the shell 108. The modules can include a body interface 381 that communicates with the shell interface 379. Thus, the body interface 381 can receive signals from the first operating system 375 and may send signals or events to the first operating system 375. The body interface 381 can communicate with an application-programming interface (API) 383. In turn, the API 383 can communicate with an operating system 393 for the shell 108. The API 383 can act as an intermediary that both controls and directs the shell OS 393 or changes the operation thereof. Thus, the API 383 can both subordinate normal OS 393 events for the shell 108 and promote the events or signals sent from the body 104.

In embodiments, the API 383 may include one or more modules. For example, the API 383 can include an interceptor module 385, a relay module 387, an injector module 389, and/or a receiver module 391. The interceptor module 385 may be operable to intercept events or processor executions that are put on the stack for the shell processor 204A. Thus, the interceptor 385 can erase, delete, or change the stack for shell 108, thus controlling what actions are conducted by the shell 108. Any events that occur on the shell 108 that are placed into the stack may be intercepted by the interceptor 385 and provided to the relay 387, which may then relay the event through the body interface 381 to the first operating system 375. The information sent from the relay 387 allows the first operating system 375 to respond to the event(s) for the shell 108.

Likewise signals from the first OS 375 to the shell 108 may be received by the receiver 391. When the first operating system 375 wants to control or have the shell 108 conduct some action, the first operating system 375 may send a signal through the shell interface 379 to the body interface 381 to the receiver 391. The receiver 391 may then pass the signal onto the injector 389, which may place the event or instruction into the stack for the shell operating system 393. Thus, the injector 389 communicates signals to the OS 393 of the shell 108 to control its actions.

In one embodiment, after the body 104 and shell 108 are paired, in the body 104, the second OS 377 may begin communicating with the first OS 375 and instruct the first OS 375 to begin signaling the shell 108 to control the shell's actions. Further, in the shell 108, the API 383 may begin to be executed and begin scanning or monitoring the stack of the shell OS 393 to intercept or inject instructions into the memory stack for the operating system 393. In embodiments, the first OS 375 may send an instruction to the API 383 to be executed. In other embodiments, a docking signal or event received from the event module 384 may cause the shell OS 393 to begin executing the API 383. Upon the execution of the API 383 and the first OS 375, the body 104 controls the shell 108. Thus, any actions being conducted on either the body 104 or the shell 108 can be executed or handled with the body 104.

Upon the body 104 initiating control over the shell 108, the shell 108 subordinates any functions the shell 108 normally executes independently. For example, any applications being executed by the shell 108 before pairing may be paused while during the pairing. Thus, any functions normally executed on the shell 108 are subordinated to the master control of the body 104. One such subordination may be the shell 108 ceasing communication with a peripheral device.

Figure 4:
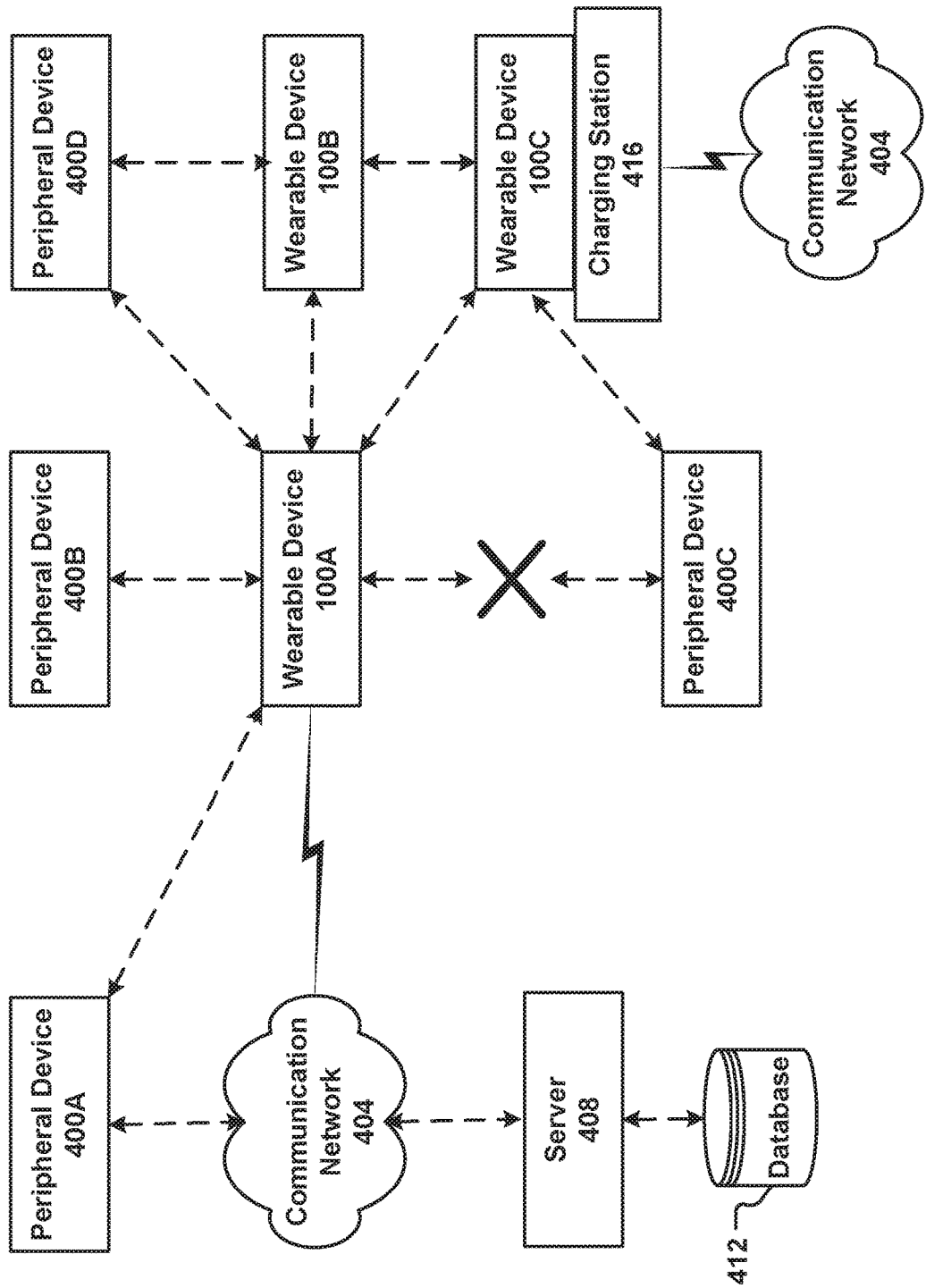
FIG. 4 is a block diagram of a wearable ecosystem in accordance with embodiments of the present disclosure illustrating a plurality of wearable devices interconnected to a variety of peripheral devices.

Referring now to FIG. 4, the wearable device 100A may also facilitate interaction between (1) one or more peripheral devices 400; (2) between the wearable device 100A and a server 408 or central data repository 412; and (3) between the wearable device 100A and another wearable device 100B, 100C. For example, in one embodiment, the wearable device 100 may receive data and facilitate communication with one or more peripheral devices 400. The peripheral devices 400 comprise any type of electronic device that can connect to, and interact with, the wearable device 100A by either sending or receiving information. Examples of peripheral devices 400 include, but are not limited to, computers, smart phones, tablets, input devices, pointing devices, accessories, appliances, displays, sensors, microphones, cameras, speakers, and other wearable devices (such as clothing and accessories including sensors, memory, and/or processors). The peripheral devices 400 can be disguised as (or incorporated in) wearable jewelry (e.g., earrings, glasses, watches, rings, necklaces, broaches, bracelets, pins, and the like) or as a feature of clothing (e.g., a button, design on the clothing, and the like).

It is an aspect of the present disclosure that multiple peripheral devices 400 can be connected to a wearable device 100 simultaneously. In one embodiment, the peripheral devices 400 may be configured to receive information from the wearable device 100.

In some embodiments, the peripheral devices 400 may be similar and/or different in functionality. For example, some peripheral devices 400 may have specific functionality (e.g., health, music, fitness, tracking, etc.). The peripheral devices 400 may be configured to send data to the wearable device 100. For example, the wearable device 100A may be linked or in communication with peripheral device 400A. Peripheral device 400A may comprise a smart phone that is connected to a network 404, a remote server 408, and database 412. Accordingly, wearable device 100A may send information to, and receive information from, the database 412 through peripheral device 400A.

The processors and associated memory of the wearable device 100 may provide additional functionality to at least some of the peripheral devices. The wearable device 100 may be configured to make the one or more peripheral devices 400 functional and/or receive data from them. For example, the wearable device 100A may also connect to peripheral device 400B. Peripheral device 400B may have less functionality than peripheral device 400A. Accordingly, peripheral device 400B may rely on the processor 204 of wearable device 100A for full functionality of its components.

With the increasing prevalence of wearables, one concern is accidently having another user's wearable device connect to your device or having to search through dozens of different wearables that are located via Bluetooth®, or some other wireless communications protocol search, to find yours. It is an aspect of the present disclosure that peripheral devices may only be allowed access to the wearable device 100 if one or more of those peripheral devices 400 have previously connected and/or under certain other circumstances.

One method of enabling access may require placing the wearable device 100 and the peripheral device in a designated location for a specific amount of time to "unlock" the connection between them. Optionally, this may include placing the wearable device 100 in physical contact with the peripheral device. Continuing this example, any peripheral devices that may also be in proximity will remain unable to access the "locked" wearable device 100 because those peripheral devices did not go through the "unlocking" procedure. The "unlocking" can be time and/or location based. In the former example, the unlocking or pairing will occur if the wearable device 100 and peripheral device are collocated for at least a threshold period of time. In the former example, the unlocking or pairing will occur if the wearable device 100 and peripheral device are positioned in a certain geographic location or set of locations and/or in a container, pairing station, or charging station 416 as illustrated in FIG. 4. Wearable device 100C is positioned for charging and/or data transmission with dock 416. The dock may include wireless communication systems to communicate with the device 100C and with network 404. Power and data may also be transferred between device 100C and dock 416 by induction coils positioned in the device and the dock. In one embodiment, a device and a peripheral device may be paired automatically when the device and peripheral device are both positioned on, or within, the dock 416. For example, in one embodiment, the dock 416 may comprise a box with an interior space or a recessed area. When each of the device 100C and peripheral device 400C are both placed within the interior or recessed area, the device 100C and peripheral device 400C may be automatically paired. In this manner, a user may not have to understand or complete a more complicated wireless pairing technique.

The container or charging station can itself message or pair with the peripheral and wearable device 100 to indicate that the peripheral and wearable device 100 can pair with one another. Alternatively, the container or charging or pairing station can electromagnetically interface with or signal the peripheral and wearable device 100 to indicate that they are in the "unlocking" or "pairing" location. As can be appreciated, the same pairing procedure may apply to adding a shell 108 to the body 104 of the wearable device 100.

In another example, wearable device 100A and peripheral device 400C may be within a predetermined proximity. Alternatively, wearable device 100A has located available peripheral device 400C by a communication network or wireless communication link. However, device 100A and peripheral device 400C have not previously been paired. Accordingly, wearable device 100A blocks access to peripheral device 400C. Optionally, device 100A may provide an indication to the user that peripheral device 400C is available for paring. Further, the wearable device 100A may provide instructions to the user to enable pairing of the wearable device 100A to the peripheral device 400C. Thereafter, after the pairing, wearable device 100A may be linked to peripheral device 400C. In one embodiment, when a body 104 and a shell 108 establish a NFC connection, they may be automatically paired. In another embodiment, user input is required to complete pairing of a body 104 and shell 108 that have established a NFC connection.

The wearable device 100A may also use network 404 to connect to a remote server 408. In this manner, the wearable device 100A may send and receive information to database 412. Thus, the wearable device 100A may connect to peripheral device 400B, retrieve data from peripheral device 400B, and send the data from device 400B to server 408 for storage in the database 412.

The wearable device 100A can also be in communication with one or more other wearable devices 100B, 100C in a group of devices. Thus, wearable device 100A may be able to send information to and receive information from peripheral device 400D that is in communication with wearable device 100B. Optionally, in one embodiment, two or more wearable devices 100A, 100B may be able to communicate with one peripheral device, for example peripheral device 400D. Additionally or alternatively, a wearable device 100 may be blocked from connecting to a peripheral device that is already in communication with a different wearable device 100. For example, wearable device 100C is in communication with peripheral device 400C. Because of this, wearable device 100A may be blocked from communicating with peripheral device 400C. In one embodiment, wearable device 100C may send a signal to peripheral device 400C that blocks a pairing between wearable device 100A and peripheral device 400C. Additionally or alternatively, wearable device 100C may optionally send a signal to peripheral device 400C that enables pairing with wearable device 100A.

After connecting to a peripheral device 400, the wearable device 100A may periodically receive data from the peripheral device. The user may establish a rule saved in memory of the wearable device 100A that establishes what type of information the user wants to receive and how frequently the information should be provided. The user may also establish a rule defining when to provide alerts to the user. For example, peripheral device 400B may be associated with an article (such as a purse, bag, or luggage) of the user of wearable device 100A. The user may establish a rule that causes the wearable device 100A to provide an alert to the user when the link to peripheral device 400B is broken or when the peripheral device 400B is more than a predetermined distance from the wearable device 100A. The alert may be an audible noise or a haptic alert, such as a vibration, provided by the body 104 or shell 108 of the wearable device 100A. Optionally, the alert may be transmitted from the wearable device 100A to another peripheral device 400D (such as an ear-bud) worn by the user. The peripheral device 400D may then provide the alert to the user.

In another example, the peripheral device 400B may be a sensor or other smart item worn by a child. The wearable device 100A may receive location information from the peripheral device 400B and provide an alert to the user when the peripheral device 400 and child enter an area defined by a geographic fence (known as a prohibited area) created by the user, enter a location of a prohibited type of business (such as a bar or other selected business chosen by the user)

or move a predetermined distance from the user. In this manner, the wearable device 100A may prevent loss of, or help locate, a person or item of value of the user.

Figure 5:
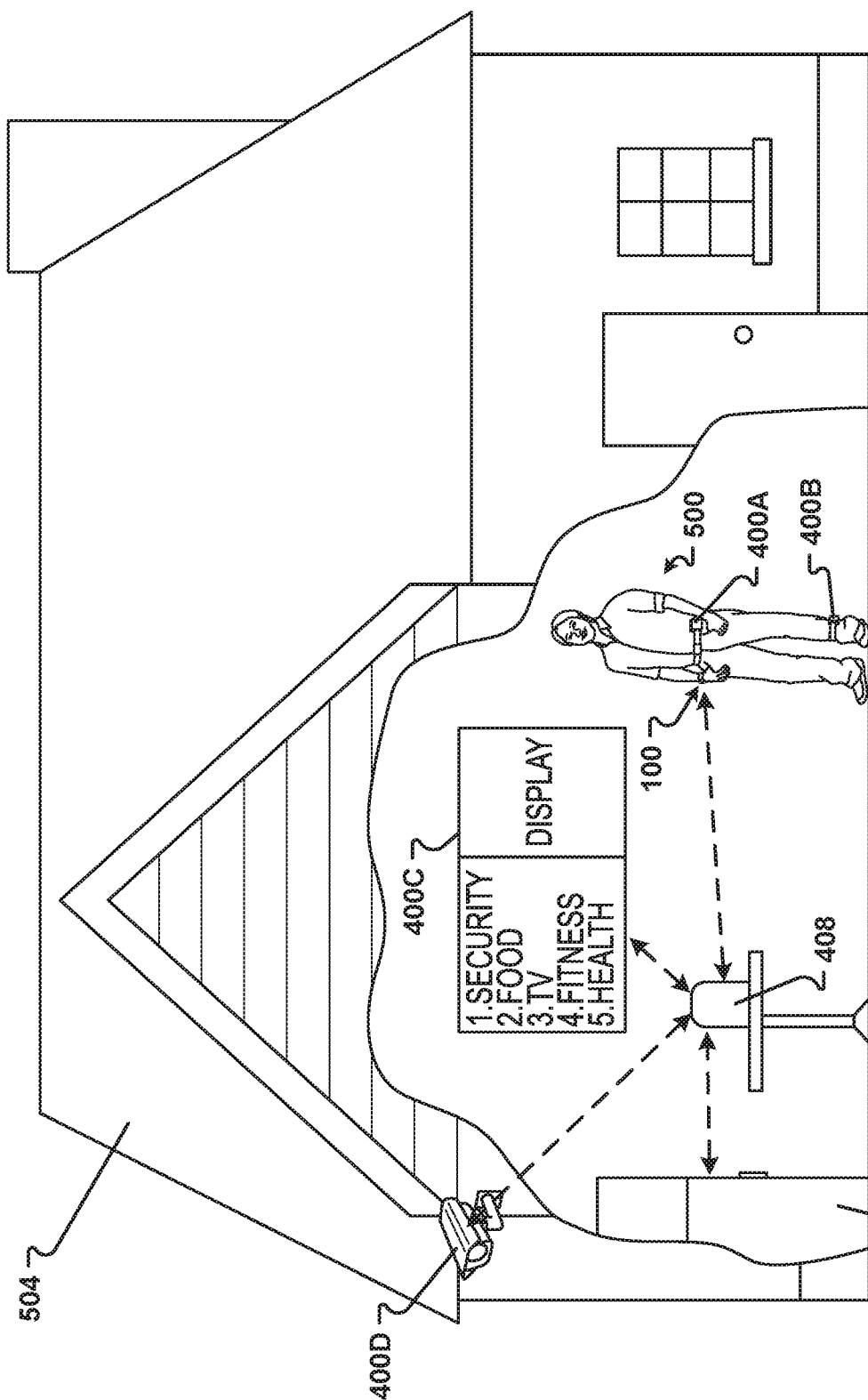
FIG. 5 depicts tracked data of a user with a wearable device transmitted and shared with other connected devices in accordance with embodiments of the present disclosure.

Referring now to FIG. 5, in addition to all the "things" that are already connected to a server 408 or central data repository of a user 500, the user's wearable device 100 may connect to the server. After completing the connection, the wearable device 100 can transmit data from the wearable device 100 and peripheral devices 400A, 400B worn by the user and in communication with the wearable device 100 to the server 408. In this manner, the user's daily fitness, health, and/or other wearable data can be received by the central data repository 408 and displayed on a display 400C alongside the data from one or more other peripheral devices, such as a security system 400D, a home appliance 400E, or other peripheral device 400 in communication with the server 408. Thus, the user can store and view data from a plurality of peripheral devices 400 in one location, rather than in a burdensome number of applications.

Optionally, wearable devices 100 of multiple users may link to and share data with the server 408. One user, such as a parent, may be a manager of the server 408 and associated peripheral devices 400. The manager may receive data from the other users. The manager may also create rules to prevent or allow users to access one or more of the peripheral devices 400C . . . 400E. In this manner, the manager may prevent other users from watching a TV 400C at certain times or until certain activities are completed by the user. Thus, the manager may create a rule that prohibits a child 500 from watching TV 400C until a certain amount of physical activity is recorded by the wearable device 100 of the child 500. In another example, the manager may determine that a child 500 has not completed a chore or schoolwork by reviewing data received from the child's wearable device 100. The manager may then create a rule in response, such as preventing the wearable device 100 of the child from accessing the internet through server 408.

In another example, one user may review data from the wearable device 100 of another user 500 to determine where the user 500 has been or how the user traveled. Position data collected by wearable device 100 may be used to determine the speed and other information about the user's travel, such as the route traveled. This data may indicate whether the user 500 has used a particular form of transportation (a public bus, a bicycle, etc) or traveled at a velocity or along a route not expected. Thus, a parent may determine that the user 500 traveled too fast or entered a prohibited area. If the user 500 has not returned home, data received over a network from the user's wearable device 100 may be used to locate the user or at least determine a last reported location of the user. Additionally, if the manager or parent determines there are gaps in the data received from the wearable device 100 of the user, the manager may determine that the user 500 has removed or turned off the wearable device 100.

In one embodiment, if wearable device 100 stops communicating with server 408, wearable devices of other users associated with the server 408 will automatically receive an alert. In one embodiment, the users receiving the alert may look for other wearable devices 100 within a predetermined proximity of the last reported location of device 100 of user 500. In this manner, the other users may send a message to people that are proximate to the last report location of the user 500 to locate the user 500. In another embodiment, when wearable device 100 stops communicating with server 408, the server may automatically report the loss of communication to a law enforcement agency or a health or security monitoring contractor, such as ADT, Medical Guardian, and the like.

In one embodiment, the wearable device 100 may recognize that the user 500 is at home 504 (or another known or user defined location) and allow automatic pairing with all available peripheral devices 400. Accordingly, the user may define a rule stored in memory of the wearable device 100 to automatically pair with all, or certain, wearable devices or peripheral devices within predetermined areas, such as a work location, home, school, etc. Similarly, the user may define a rule that is stored in memory that prevents the wearable device 100 from automatically pairing with any, or certain wearable devices or peripheral devices in other areas, such as public locations (stores, streets, residences, etc).

Figure 6:
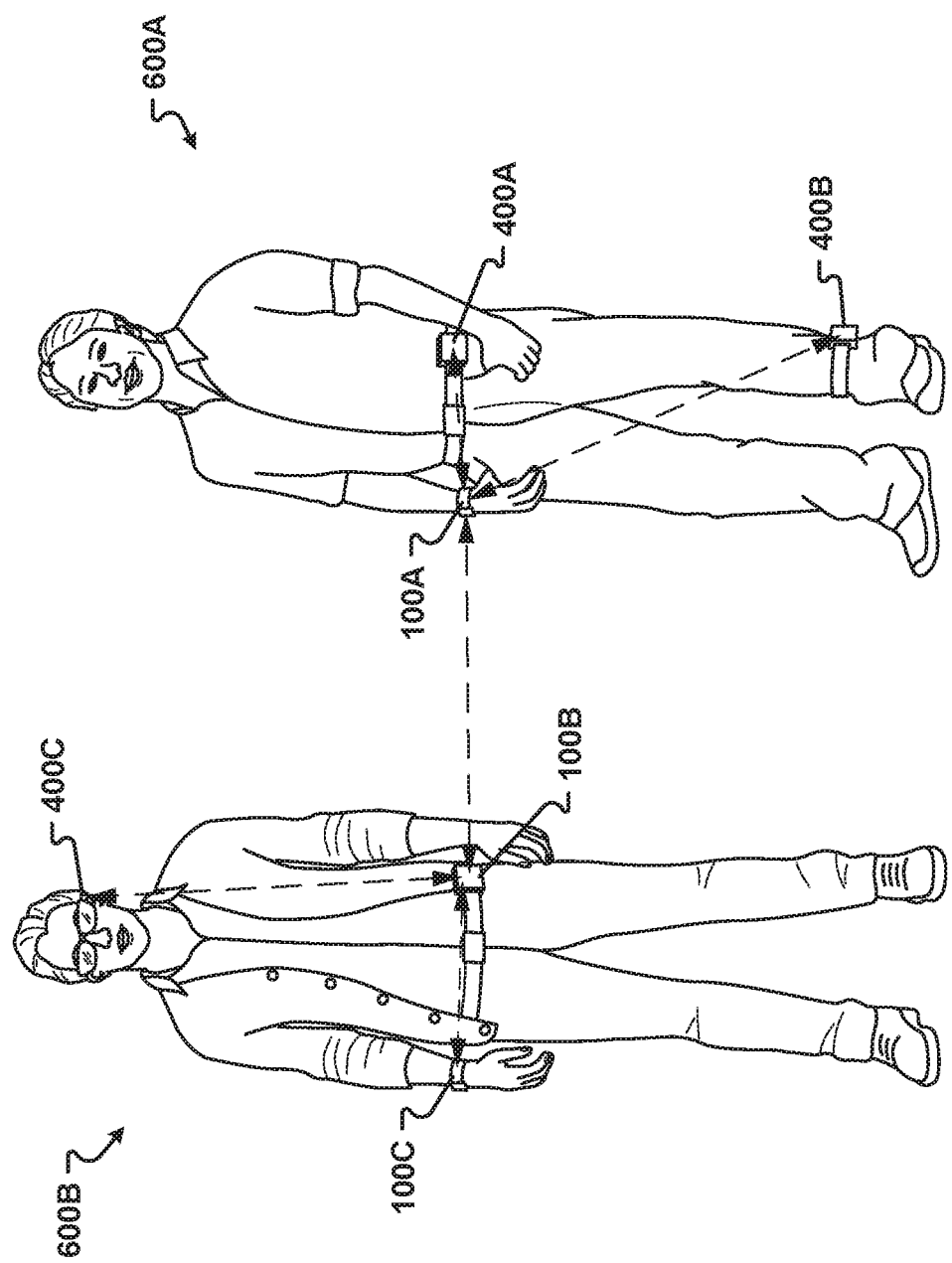
FIG. 6 depicts wearable devices worn by two different users in communication with each other and with other peripheral devices associated with the users in accordance with embodiments of the present disclosure.

Referring now to FIG. 6, in other examples, a user 600A with a wearable device 100A may connect with a wearable device 100B of another user 600B. In this manner, users 600 may exchange data between their connected peripheral devices 400A . . . 400C. Optionally, the users may establish rules stored in memory of their wearable devices to prevent or enable sharing of data from one or more of their peripheral devices with the other user. For example, user 600B may allow data from second wearable device 100C to be shared with the wearable device 100A of user 600A. However, user 600B may create a rule stored in the memory of device 100B that prevents the wearable device 100A from sending information to, or receiving information from, the smart glasses 400C of user 600B.

In one embodiment, the connection between devices 100A, 100B may be limited by the type of wireless communication network used. Accordingly, the cellular telephony module 228 or the wireless communication module 232 may be used to establish the connection whenever devices 100A, 100B are within communication range of each other and a wireless network is available. In this manner the connection may be limited to when the devices 100A, 100B have access to the same network. Optionally, the connection between devices 100A, 100B may be limited to a predetermined distance or predetermined times. For example, either user 600A or 600B may create a rule that prevents or allows their wearable devices 100A, 100B to establish the connection with another wearable device 100 within a certain proximity or at certain times and locations. Additionally or alternatively, a user may create a list of other users (for example, by name, device number, etc) that are permitted to automatically pair their wearable devices with the wearable device of the user. Similarly, the user may create a list of other users that are not allowed to pair with the user's wearable device.

In one embodiment, the smart glasses 400C of user 600B may have limited processing capability. The wearable device 100B may provide the processing, an enable the sensors, of the glasses 400C. Thus, the wearable device 100B may provide user interfaces for display on a display associated with the glasses 400C, such as to project an image on the lenses of the glasses. In this manner, as the glasses have a reduced processing capability, the glasses require less battery power and a corresponding increased operating time. Further, as the glasses require fewer components and instead rely on the capabilities of the wearable device 100B, the size, weight, and cost of glasses may be reduced.

Figure 7:
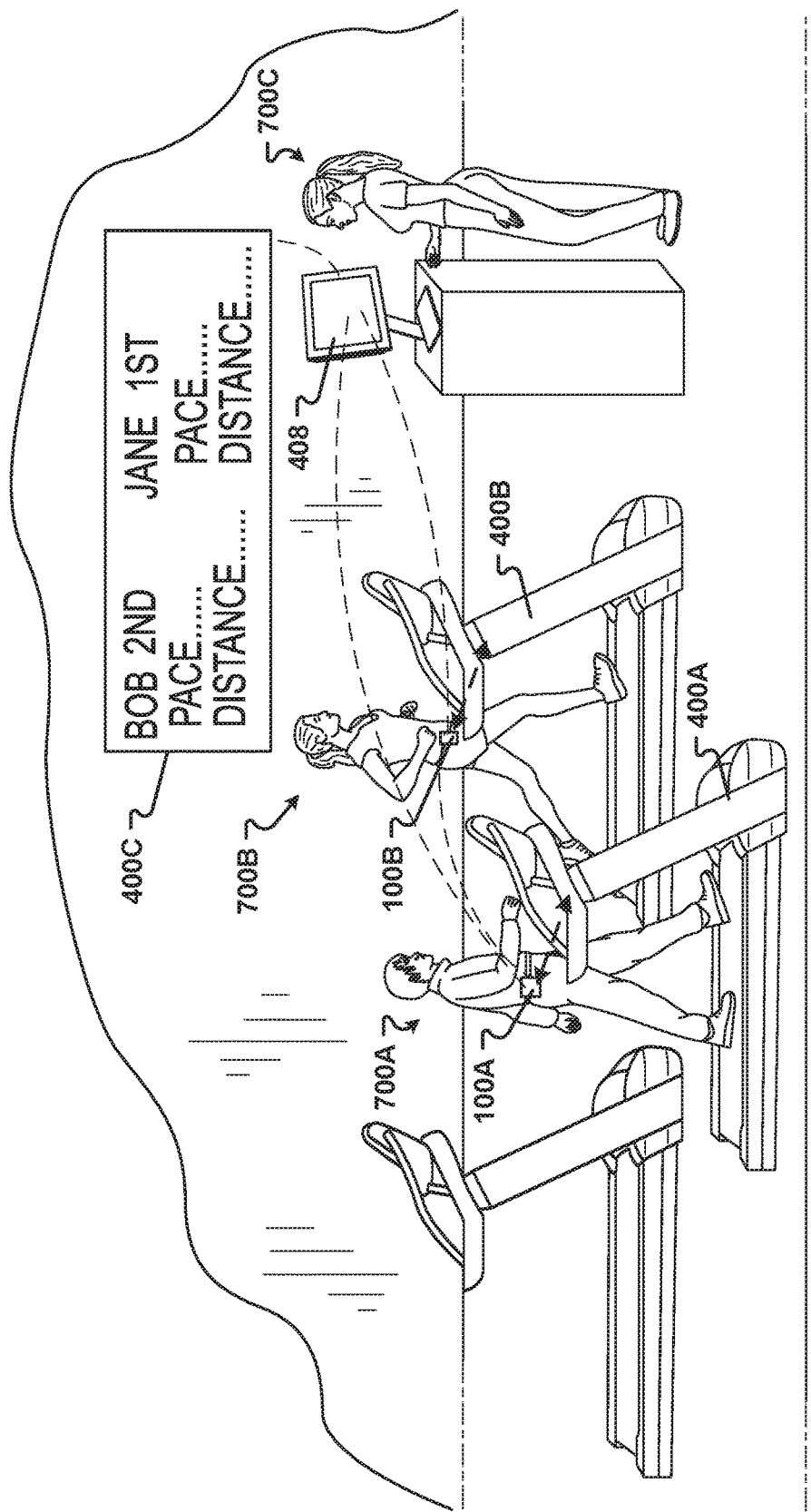
FIG. 7 depicts a group exercise scenario of users and their wearable devices transmitting tracked data to each other and to a server and associated peripheral devices in accordance with embodiments of the present disclosure.

Referring now to FIG. 7, other embodiments of the present disclosure allow wearable devices 100A, 100B of different users 700A, 700B to connect to each other and, optionally, to a server 408. For example, users 700A, 700B may enter a workout class. The wearable devices 100A, 100B of the users may automatically synchronize with each other. In this manner, the users may receive data from the other user's wearable device 100. This may facilitate competition between the two users and increase the efficiency of the workouts of the users. The wearable devices 100A, 100B may also pair with respective peripheral devices 400A, 400B which, in this example, comprise exercise machines. Additionally or alternatively, in the context of a gym or commercial recreational facility, an exercise leader, or instructor 700C, can monitor one or more user's progress and activity from data received by a server 408 from the one or more wearable devices 100A, 100B. This approach may allow for competitions between players/exercisers 700A, 700B connected to the each other. Further, the instructor 700C may then present information on the progress or health of the users 700A, 700B on a connected peripheral device 400C, such as a display device.

Each user 700A, 700B may create a rule stored in memory of their wearable devices 100A, 100B that defines which information, or all information, to share with the other wearable devices and the server 408. For example, user 700A may decide to share all data collected by wearable device 100A with others devices 100B, 408. Additionally or alternatively, user 700A may decide to share some information with device 100B and share different or no information with device 408. Further, user 700B may decide to share some information collected by wearable device 100B with other users 700A, 700C. For example, user 700B may decide to share pace and distance information collected by device 100B. However, user 700B may prevent device 100B from sharing health data, such as heart rate, respiration rate, etc, collected or accessible by device 100B.

Additionally or alternatively, the rules created by the users 700A, 700B may be location or context based. The user 700B may allow certain information, such as health data, to be shared with other devices 100A and the server 408 when the wearable device 100B determines that the user is in a gym. The wearable device 100B may connect to the server 408 or access another database with information about the location. After determining the location is a gym, the wearable device 100B may share a predetermined amount and type of information. Alternatively, if the user 700B is in a different location, the wearable device 100B may determine that the user 700B is in a restaurant or bar, or some other public location in which the user 700B has created a rule to limit the sharing of data or the pairing of device 100B with other wearable devices 100 and servers 408. The wearable device 100B may determine the type of location based on information received from a database of locations, such as Google Maps or other databases of geographical information systems accessible over a network or saved in memory of the device 100B. In one embodiment, the device 100B may provide an alert to the user to select a level of data or pairing allowed in the facility.

In some embodiments, multiple wearable devices 100 may be in communication with one another, without having to be connected to a hub or server. This approach may be useful for group activities that take place outdoors or otherwise away from a server. For example, multiple runners in a group could have wearable devices 100 that are synced or otherwise in communication with each other. If one person in the group begins slowing, that user's device 100A will let at least one other device 100B of another user or all other devices 100 of the group know of the change in pace. Alternatively, the synced devices could set the pace and even monitor the health for one or more users in the group. For example, an alert may be provided to one or more members of the group if at least one member has a health issue such as a heart rate that is too high or too low, a body temperature or respiration rate outside of a pre-defined range, etc.

Figure 8:
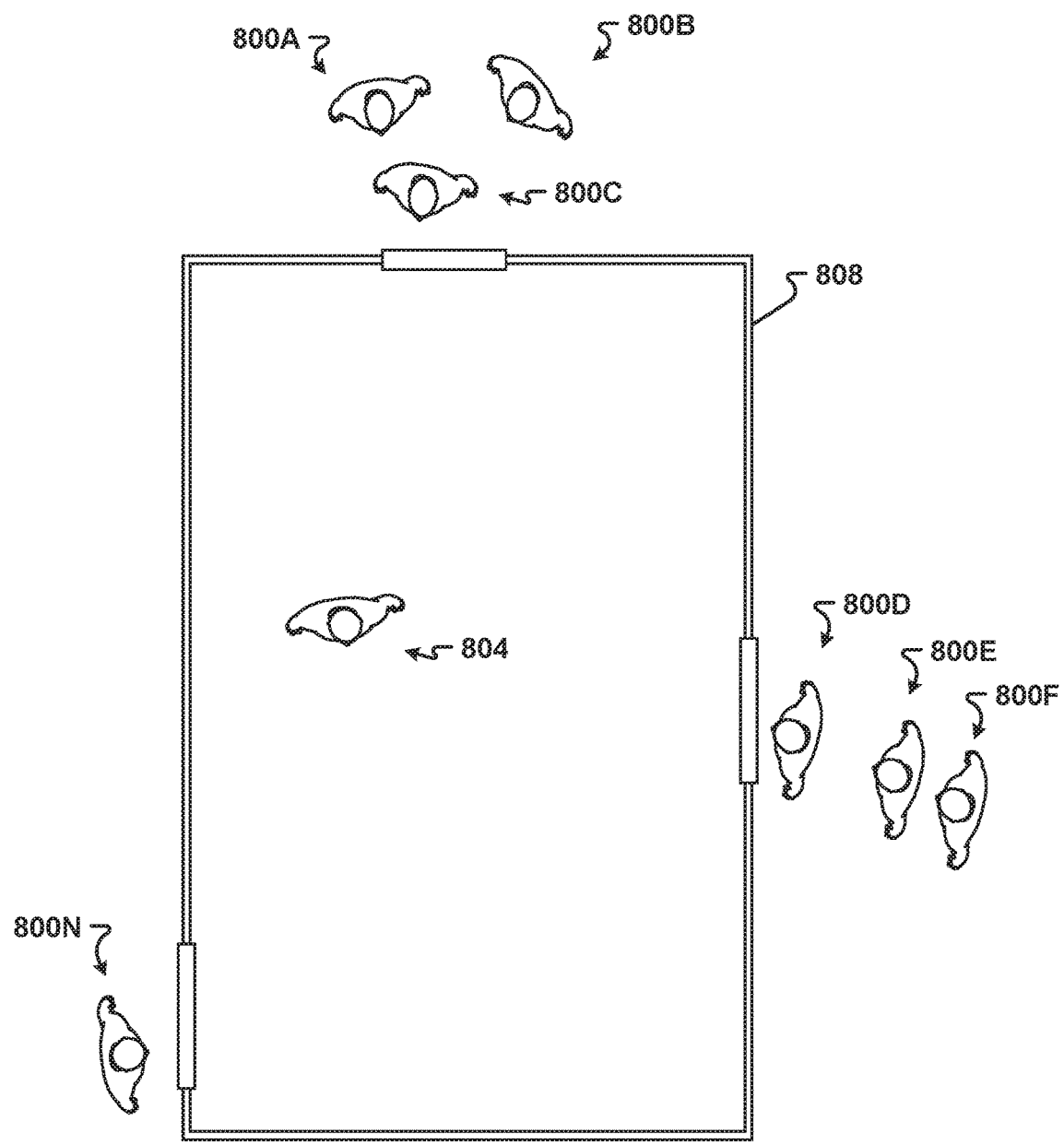
FIG. 8 is a diagram of a wearable ecosystem environment in a coordinated entry application in which users each have wearable devices in accordance with embodiments of the present disclosure.

Referring now to FIG. 8, an additional embodiment for this disclosure may be directed to military, police, and/or firefighter groups, etc. For example, in a coordinated entry or exit situation all of the users in a group 800A . . . 800N that each have a wearable device (not illustrated) can be efficiently alerted at a particular moment or time to move. Further, each user 800A . . . 800N may receive information from the wearable devices 100 of the other users. As shown in FIG. 8, multiple users 800A . . . 800N are preparing to enter a room 808. The users may desire to enter the room at substantially the same time, for example, to prevent a target person 804 from responding to one point of entry. In this case, the users may synchronize their devices prior to entering the building. A primary user 800A may provide a "breach" input to send a predetermined signal to each user and their respective device. This signal may be presented to a user visually, audibly, and/or via tactile output depending on the preferences selected. In some embodiments, each of the users may have a particular shell 108 that is configured to provide this functionality.

This approach can allow the users 800 to enter a building or room 808 and even know where all other users 800A . . . 800N are in relation to each other and to a target person 804. In some embodiments, this approach can encourage an increase in communication and decrease the risk from accidental firing, failed communication, leaving a member of the group of users behind, and/or other related accidents.

Optionally, at wearable device 100 of one of the users, for example user 800A, may control the wearable devices of the other users. Additionally or alternatively, the wearable device of user 800A, may limit the functionality of the devices of the other users 800B . . . 800N. For example, device 100A of user 800A may prevent the other devices 100B . . . 100N from connecting to other devices, from producing audible sounds, from disconnecting from devices 100A . . . 100N, and/or joining with another device 100 or accessing other available networks. Additionally, user 800A may limit the amount of information devices 800B . . . 800N share with each other. In this manner, the user 800A may eliminate distractions to users 800B . . . 800N and prevent others from contacting users 800B . . . 800N. Further, by limiting the data shared between users, user 800A may prevent overloading a network connection or the delay of transmission of information by less important information.

The devices of users 800A . . . 800N may store sensor data in memory for later analysis. The data may be downloaded later to review movements of individual users and how the group of users 800A . . . 800N performed. For example, each device of users 800A . . . 800N may record information such as the position of each user, heart rate, respiration rate, etc., that is collected and stored in memory at a predetermined rate. The rate may be between approximately 0.01 seconds to about 120 seconds depending on the activity. The period of collection of the data may be set before or during the activity. In one embodiment, the period of collection of data may be set at a first rate (such as every 20 seconds) before the activity and set at a second faster rate (such as every 0.5 seconds) during the activity. This information may be used to determine if one of the users moved improperly or prematurely or if any of the users were out of a predetermined alignment or formation. Further, if a user had a heart rate or other biological rate that was outside of a predetermined range, the user's health record may be reviewed before the user participates in another group activity.

An additional embodiment may apply to recreational purposes. For example, in a game of "capture the flag," being connected with the other members of a team can allow for coordinated strategy. This ability may provide a variety of improvements to recreational games. For example, members of a group activity, such as football, soccer, baseball, basketball, swimming, gymnastics, or any other team activity may each be provided with a wearable device 100. The coach or coordinator of the group activity may then use data received from the wearable devices 100 to view movements of the individuals during the group activity. For example, a football coach may determine that players are not in the right positions, or move too early or too late, by reviewing position data received from player wearable devices 100.

Additionally, data from wearable devices 100 of a group of people may be used to reconstruct and accident scene. For example, if victims of an accident, such as a vehicle crash, are wearing devices 100, the movement and position data collected by the devices may be used to determine a cause of the accident. The devices may detect a sudden deceleration (or acceleration) above a predetermined amount and determine that the device is in a crash or accident mode. The device may then increase the sample rate of the sensors to collect and store position and other sensor data more frequently. The device 100 may also determine that the data collected in the crash mode should be stored for longer, or have priority over, other data if memory is limited. Thus, the device may erase other stored data to store as much of the data collected during the accident as possible. Additionally, upon detection of a force (a deceleration or an acceleration) above a predetermined amount, the device 100 may send an alert to another device over a network. Optionally, the alert may be repeated periodically and may provide a location of the device 100. Thus, the device 100 may serve as a beacon to help locate the device 100 and an associated user.

Figure 9:
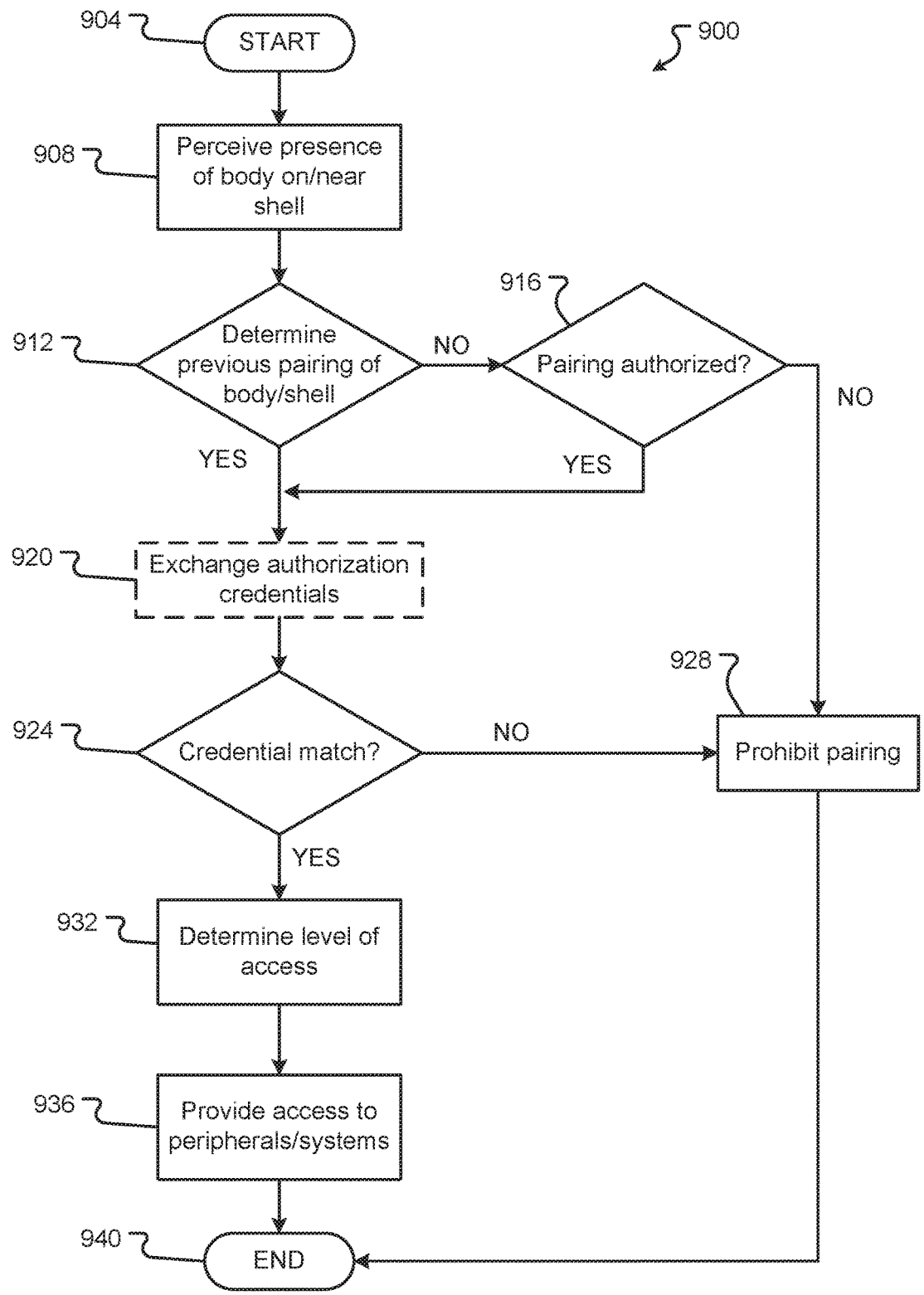
FIG. 9 is a flow chart of an embodiment of a method for pairing a body and a device to form a wearable device according to an embodiment of the present disclosure.

An embodiment of a method 900 for pairing a body 104 and a shell 108 of a wearable device 100 is shown in FIG. 9. Generally, the method 900 starts with a start operation 904 and ends with an end operation 940. While a general order for the steps of the method 900 is shown in FIG. 9, the method 900 can include more or fewer steps or can arrange the order of the steps differently than those shown in FIG. 9. Additionally, although the operations of the method 900 may be described sequentially, many of the operations may in fact be performed in parallel or concurrently. The method 900 can be executed as a set of computer-executable instructions executed by a computer system and encoded or stored on a computer readable medium. Hereinafter, the method 900 shall be explained with reference to the systems, components, modules, software, data structures, user interfaces, etc. described in conjunction with FIGS. 1-8.

The body 104 or the shell 108 may perceive the presence of the other of the shell 108 and the body 104, in step 908. The presence may be determined by alignment features 140 of the body 104 interacting with corresponding alignment feature 144 of the shell 108. For instance, a contact signal may be detected by an interconnection sensor 180 associated with the alignment features 140, 144. The contact signal may be transmitted by the bus 220, 220A to the device state module 374 and/or the event module 384. Additionally or alternatively, a wireless communication module 232 or induction coils 284 of the body 104 may detect signals from the communication module 232 or induction coils 284 of the shell 108. A signal or electrical/magnetic field may be detected by the communication module 232 or coils 284 or other sensor/receiver. In one embodiment, one or more other sensors, e.g., proximity sensors, sensors associated with port interfaces 152, etc., can determine the presence or proximity of the shell 108 to the body 104 and provide that information to the device state module 374.

The device state module 374 of one or both of the body 104 and the shell 108 may determine that the shell 108 is proximate to the body 104 and/or has been interconnected to the body 104. The change of state may be communicated to the processors 204 of the body 104 and the shell 108 and to the event module 384. Further information may then be communicated to the processors to determine if the body 104 and the shell 108 have been previously paired. More specifically, an identifier of the body 104 may be received by the shell 108. Additionally or alternatively, an identifier of the shell 108 may be received by the body 104. The event module 384 of the body 104 may determine if the identifier of the shell 108 matches a list of identifiers stored in memory of shells that have been paired to the body 104. Additionally or alternatively, the event module 384 of the shell 108 may similarly determine if the identifier of the shell 108 matches a list of identifiers stored in memory of bodies that have been paired to the shell 108.

The event modules 384 of the body 104 and the shell 108 may determine whether the body 104 and the shell 108 have been previously paired, in step 912. Prior pairing may be required for automatic re-pairing of the body 104 and the shell 108. If the body 104 and shell 108 have been previously paired, the method 900 can proceed YES to step 920. However, when the body 104 and shell 108 have not previously paired, the method 900 can proceed NO to step 916.

In step 916, the event module 384 can review rules stored in memory to determine if pairing of the body 104 and shell 108 is authorized. For example, the event module 384 of the body 104 and check a list of pre-authorized shells that have been approved for pairing with the body 104. Similarly, the shell event module 384 may also check a list of pre-authorized bodies that are approved for pairing with the shell 108. Additionally or alternatively, the event module 384 of the body 104 and shell 108 may also check black lists, or lists of bodies and shells that are not authorized to pair with the corresponding shell 108 and body 104.

In another example, the event module 384 may determine that pairing is authorized based on a rule saved in memory. The rule may authorize pairing of a body 104 and shell 108 that are within a predetermined proximity. For example, in one embodiment, a body 104 and shell 108 may be authorized to automatically pair when they are in contact with each other. Another rule may authorize a body 104 and a shell 108 to automatically pair when the body 104 and shell 108 are located in a predetermined geographic location. For example, a user may authorize automatic pairing of shells and bodies within the user's home, work, or any other user-defined location. Alternatively, the user may authorize automatic pairing between a body 104 and certain types of shells, or shells with certain features. Still further, the rule may authorize automatic pairing of any shell 108 and body 104 that are both on a charging station, such as exemplary station 416 illustrated in FIG. 4.

Additionally, the user of the body 104 and the shell 108 may be queried to provide instructions to permit or prohibit the pairing of the body 104 and shell 108. For example, the user of the body 104 and/or the shell 108 can provide an input to authorize the pairing of the body 104 and the shell 108. Accordingly, when a body 104 detects a proximity of a shell 108 that has not previously paired with the body 104, the shell 108 may provide an indication of the shell 108 to the user. The indication may be provided on a user-interface or may be an audio or other message. The user may then provide an input to authorize or prohibit the pairing.

If the pairing of the body 104 and shell 108 is authorized, the method 900 can proceed YES to step 920. Otherwise, if one of the event module of the body 104 or the shell 108 determines pairing is not authorized, the method 900 can proceed NO to step 928.

In step 920, the body 104 and the shell 108 can optionally exchange authorization credentials. Here, the shell 108 may provide a key or other security credentials to the DM Module 324 of the body 104. Each of the body and the shell 108 may store security credentials in memory. Once received, the DM Module 324 of the body 104 can compare the received credentials to credentials stored in memory. Likewise, the shell 108 may receive and check credentials provided by the body 104. Either or both the body 104 and/or the shell 108 can determine if the received (exchanged) credentials match the credentials stored in memory in step 924. The determination is made by determining if the received key or credentials compare favorably to a stored key or credentials. If the credentials match, the method 900 proceeds YES to step 932. If the credentials do not match, the method 900 proceeds NO to step 928.

The body 104 or shell 108 can prohibit pairing in step 928. An indication may be given to the user that the sharing is not allowed (or has been prohibited). Then, body 104 or shell 108 may prevent any access to systems, memory, data, or other components of the other of the shell 108 and the body 104. Thus, data transfers may be prohibited by disabling the data transfer mechanisms of either the body 104 or the shell 108. Method 900 may then proceed to End 940.

In step 932, the DM module 324 of the body 104 may determine a level of access to provide to the shell 108. The shell DM module may also determine a level of access to provide to the body 104. Here, the DM module 324 of the body 104 (and the shell 108) can use the key or credentials used or determine some other form of identification for the shell 108 (and the body 104). Based on the information, the DM module 324 can access rules about what the shell (or the body 104) is allowed to access. The access information may be stored in the memory of each of the body 104 and the shell 108. This access information may be different for each shell 108 paired to the body 104 (and for each body 104 paired with the shell 108). Thus, some shells 108 may have full access to all hardware, data, modules, etc of a body 104. Similarly, some bodies 104 may have full access to all hardware, data, modules, etc of a shell 108. For example, the user may allow the user's shells to access all data of the user's bodies. However, the user may limit the amount of data (or other hardware, modules, etc) that a shell 108 the user does not own may access when the shell 108 is paired with a body 104 of the user. Other shells 108 may only access hardware but not access any stored data of the body 104. Similarly, some bodies may be authorized to access some hardware but not any data of a shell 108. In another embodiment, one of the body 104 or the shell 108 may authorize only the transfer of power to the other one of the shell 108 and the body 104. The configurations of what may be accessed by each body 104 and shell 108 that are paired are numerous and are understood by those skilled in the art.

After determining the level of access, the body 104 and the shell 108 can provide the access to the hardware, data, systems, components, modules, power transfer mechanisms, etc., in step 936. Thus, the body 104 and the shell 108 of the wearable device 100 may then communicate through the data wireless communication modules 232, induction coils 284, and/or the port interfaces 152 of the body 104 and the shell 108. Further, power may then be transferred between the body 104 and the shell 108 through the induction coils 284 or the port interface 152.

Figure 10:
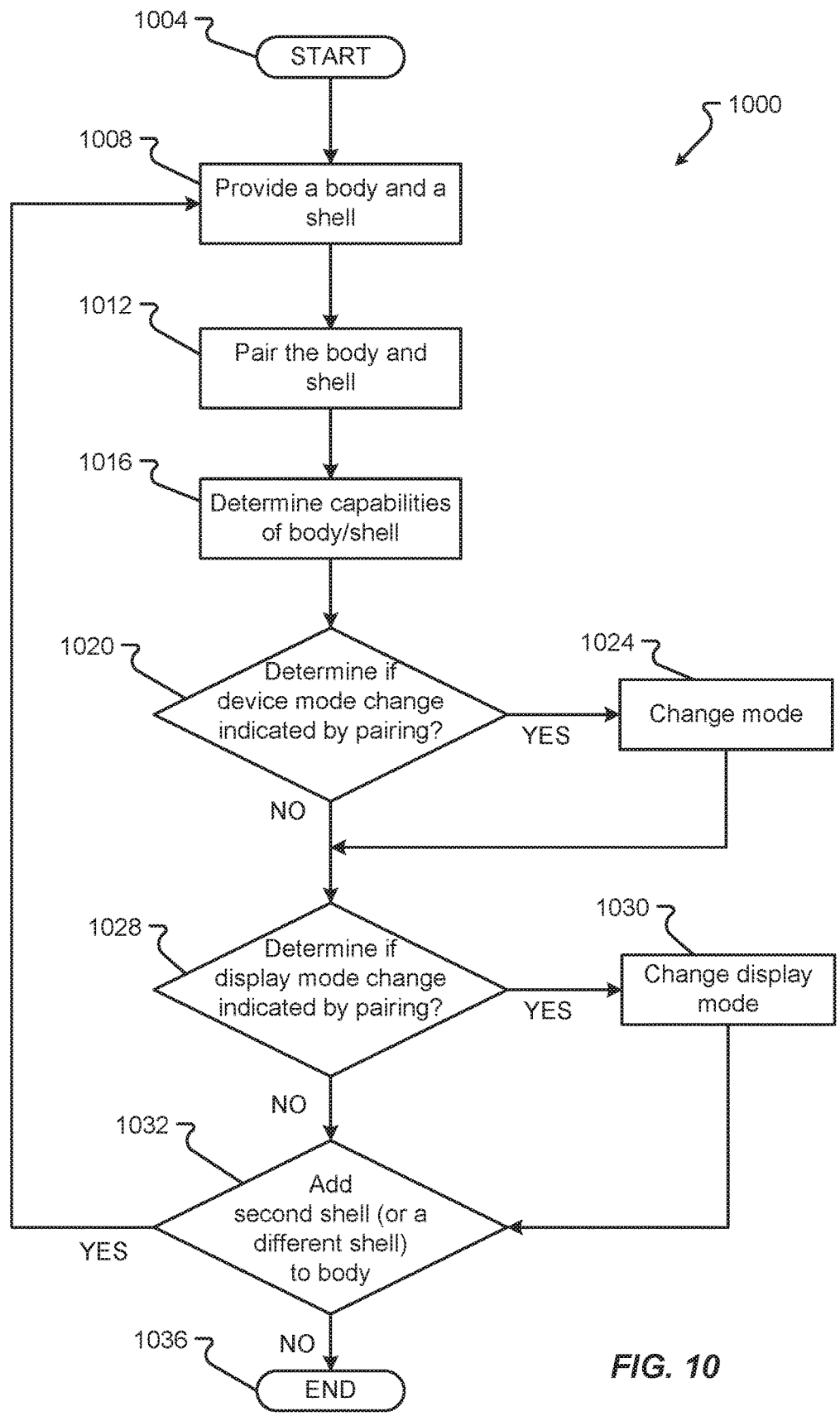
FIG. 10 is a flow chart of an embodiment of a method for changing a device mode or a display mode of a wearable device after pairing a body and a shell.

Another embodiment of a method 1000 for pairing a body 104 with a shell 108 to form a wearable device 100 is shown in FIG. 10. Generally, the method 1000 starts with a start operation 1004 and ends with an end operation 1036. While a general order for the steps of the method 1000 is shown in FIG. 10, the method 1000 can include more or fewer steps or can arrange the order of the steps differently than those shown in FIG. 10. Additionally, although the operations of the method may be described sequentially, many of the operations may in fact be performed in parallel or concurrently. The method 1000 can be executed as a set of computer-executable instructions executed by a computer system and encoded or stored on a computer readable medium. Hereinafter, the method 1000 shall be explained with reference to the systems, components, modules, software, data structures, user interfaces, etc. described in conjunction with FIGS. 1-9.

A body 104 and a shell 108 may be provided, in step 1008. In embodiments, the body 104 may display one or more user interfaces one a display 110 before docking occurs. Alternatively, the body 104 may be devoid of a display 110. The shell 108 can include a display 114 that is operable to present a user interface. The user interface can include any window or other display element, such as a desktop. The device 104 and the shell 108 may be paired, as described above in method 900 of FIG. 9, in step 1012.

Pairing the body 104 and the shell 108 may include electrically connecting the shell with the body 104. The electrical connection may be made with a port interface 152, wireless communication module 232, or inductive coils 284. Accordingly, the electrical connection between the body 104 and the shell 108 may be by a wired or a wireless interface, or by other device or connection. Once paired, the shell 108 may be controlled or managed by the body 104. For example, in one embodiment, the shell 108 includes only limited processing capability, or no processing capability, and the components of the shell 108 rely on the body 104 for full capability and control. In another embodiment, the body 104 may control the shell 108 using the software and modules described in conjunctions with FIGS. 3C and 3D. Thus, the hardware, sensors, memory, and modules of the shell 108 may be managed, accessed, and controlled by the body 104. Alternatively, the shell 108 may control or manage the body 104 after the docking. In this embodiment, the body 104 has limited or no processing capability and the components of the body 104 rely on the processor of the shell 108 for full capability and exploitation. Thus, the body 104 and the shell 108 are paired to form the wearable device 100.

The behavior of the wearable device 100 after the pairing may be governed by a set of pairing rules. The device state module 374 of the body 104 can determined the capabilities of the shell 108 in step 1016. This may include determining the hardware, modules, and other features accessible in the shell 108. Additionally or alternatively, the shell device state module 374 may determine the capabilities of the body 104.

After pairing, the DM Module 324 may determine if a mode of the wearable device 100 should change as a result of the pairing, in step 1020. The determination may include the DM Module 324 receiving information on the capabilities of the shell 108 and the body 104 from the device state module. For example, if the body 104 may determine that the shell 108 is decorative and has no additional capabilities. In this example, no mode change is indicated. Alternatively, the decorative shell 108 may cause the wearable device 100 to enter a quiet mode. For example, the user may pair a decorative shell 108 to the body 104 to hide the capabilities of the body 104. Thus, in one embodiment, in the quiet mode the wearable device 100 may turn off wireless communication modules 228, 232 of the body 104 to prevent transmission of signals to or from the body 104.

Alternatively, the body 104 may determine that the shell 108 is associated with a fitness activity. Accordingly, the wearable device 100 may change to a fitness mode. This may include collecting biometric information of the wearer at a different frequency. Thus, sensors of the body 104 and the shell 108 may collect information more frequently. Additionally or alternatively, in the fitness mode, the device 100 may share sensor data with peripheral devices automatically.

In another example, the shell 108 may be associated with a sport and the wearable device 100 may change to a sports mode. The sports mode may include recording a location of the wearable device 100 more frequently so that movement of the wearable device 100 may be tracked over time to more accurately determine the position of the wearable device 100.

Another mode is a coordinated movement mode activated by a shell 108. The coordinated movement mode may include the wearable device 100 measuring a proximity to other wearable devices. The coordinated movement mode may also include allowing the wearable device 100 to be controlled by a master portable device. Accordingly, the master portable device may limit or prohibit use by the user of certain functions of the wearable device 100. Other modes are contemplated.

If a device mode change is indicated by the pairing, the method 1000 may proceed YES to step 1024. If no mode change is indicated by the pairing, the method 1000 may proceed NO to step 1028. In step 1024, the change of mode is implemented. This may include activating or deactivating one or more modules or hardware elements of the body 104 or the shell 108. For example, one mode change may include changing sensor sample rates. Another mode change may include storing new data and erasing older data. Still another mode change may include preventing or enabling wireless communication with the wearable device 100.

The pairing of the device 104 and the shell 108 may also include a display mode change, in step 1028. For example, a body 104 that does not include a display may be paired with a shell 108 that includes a display 114. Alternatively, the body 104 may include a display 110 and the shell 108 may be devoid of a display. Additionally or alternatively, each of the body 104 and the shell 108 may include a display. Accordingly, after the pairing, the DM module 324 can determine the capabilities of each of the body 104 and the shell 108 and determine if a display mode change is indicated by the pairing. If the display mode should change as part of the pairing, the method 1000 may proceed YES to step 1030. If the display mode does not change, the method 1000 may proceed NO to step 1032.

In step 1030, the DM module 324 can change the display mode as indicated by the capabilities of each of the body 104 and shell 108 paired to form the wearable device 100. If the body 104 does not include a display and the shell 108 includes a display 114, the DM module 324 may generate a user interface on the shell display 114. In one embodiment, this comprises a display controller 216B of the body 104 generating the user interface. Alternatively, in another embodiment in which the shell 108 includes a display controller 216C, the shell display controller may generate a user interface for the shell display 114. The method 1000 may then proceed to step 1032.

In another embodiment in which each of the body 104 and the shell 108 include displays 110, 114, changing the display mode may include determining if the body display 110 was presenting a display (e.g., a window or other user interface on display 110) before the pairing. If display 110 was presenting a display, the display may be migrated from the body display 110 to the shell display 114. Migrating the display may include changing the size, orientation, or resolution of the window or UI displayed by display 110 for presentation on display 114. In one embodiment, a display buffer is simply changed to reflect the migration. Optionally, in one embodiment, the display controller 216B of the body 104 may control the display of the window or UI on display 114 of the shell 108. Alternatively, the display controller 216C of the shell 108 may control the display of the window or UI on display 114. In still another embodiment, if the body 104 includes a display 110 and the shell 108 does not include a display, changing the display mode may include ceasing display of a UI or window displayed on display 110.

In step 1032, method 1000 may determine if a second shell should be added to the paired body 104 and shell 108 of the wearable device 100. Alternatively, in step 1032, the body 104 may determine whether the shell 108 has been removed from the body 104 and that a second shell 108 is available for pairing with the body 104. If a second shell 108, or a different shell 108, should be paired with the body 104, the method 1000 loops YES to operation 1008. Otherwise, method 1000 proceeds NO to end 1036.

Figure 11:
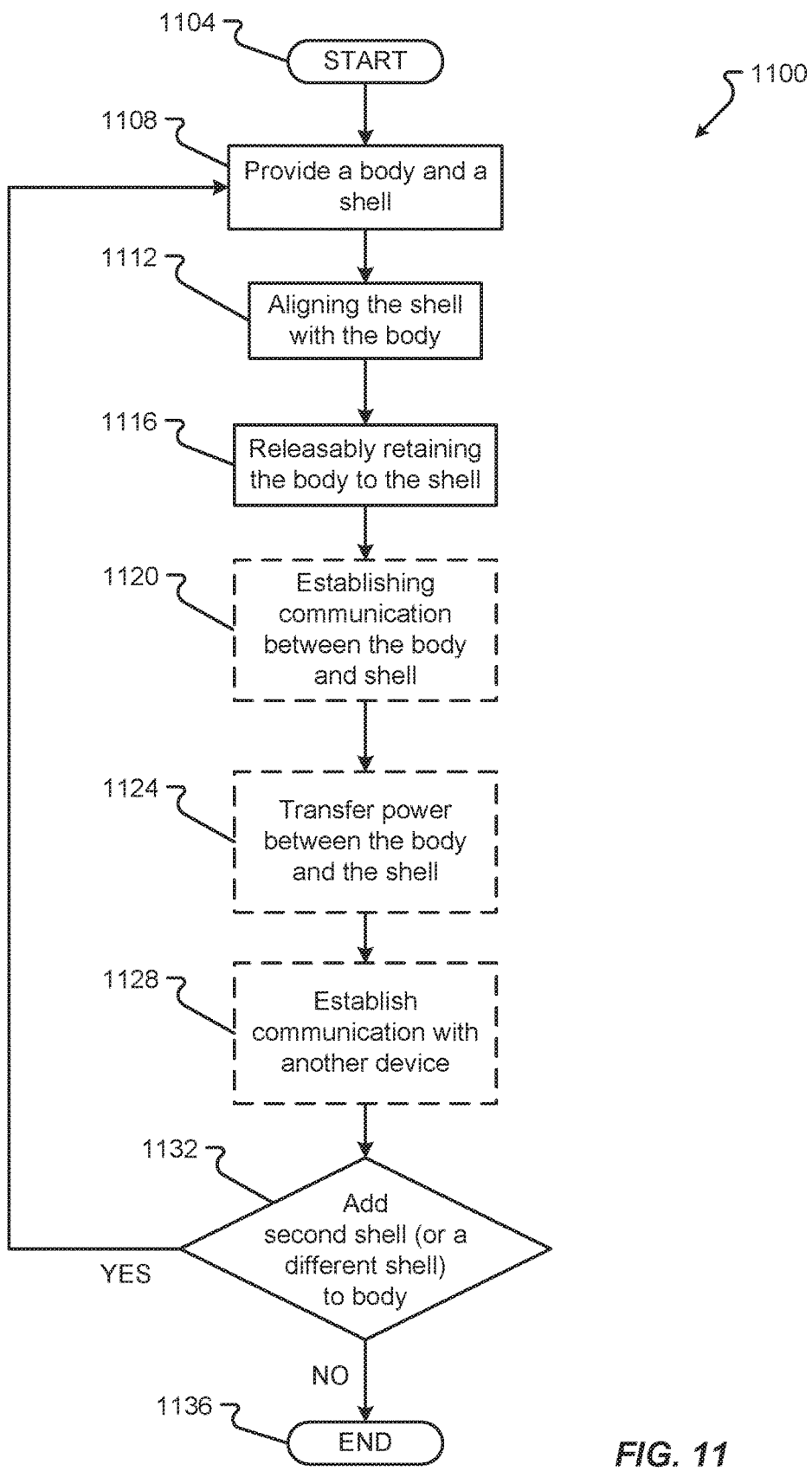
FIG. 11 is another flow chart of an embodiment of a method for interconnected a shell to a body of a wearable device according to another embodiment of the present disclosure.

An embodiment of a method 1100 for interconnecting a body 104 and a shell 108 to form a wearable device 100 is shown in FIG. 11. Generally, the method 1100 starts with a start operation 1104 and ends with an end operation 1136. While a general order for the steps of the method 1000 is shown in FIG. 11, the method 1100 can include more or fewer steps or can arrange the order of the steps differently than those shown in FIG. 11. Additionally, although the operations of the method may be described sequentially, many of the operations may in fact be performed in parallel or concurrently. The method 1100 can be executed as a set of computer-executable instructions executed by a computer system and encoded or stored on a computer readable medium. Hereinafter, the method 1100 shall be explained with reference to the systems, components, modules, software, data structures, user interfaces, etc. described in conjunction with FIGS. 1-10.

A body 104 and a shell 108 are provided, in step 1108. The body 104 generally comprises a housing 106, a retention element 120, and an alignment feature 140. In one embodiment, the body 104 further comprises a processor 204, memory 208, and a sensor 180. The body 104 may further optionally include any of the components illustrated in FIG. 2A. Optionally, in an embodiment, the processor, memory, and the sensor are encapsulated within a portion of the body 104 such that body 104 does not include any external openings or apertures. In one embodiment, the sensor is positioned proximate to an interior surface 136 of the body 104. Additionally or alternatively, at least a portion of the material of the body 104 proximate to the sensor is electrically conductive. In another embodiment, an electrically conductive material is encapsulated within the body 104 and transmits signals from the skin of a wearer to the sensor 180. The body 104 may further include an induction coil 284. In one embodiment, the alignment feature 140 protrudes at least partially from an exterior surface of the body 104. In another embodiment, the alignment feature is formed on the housing 106 of the body 104.

The shell 108 generally includes housing 118, a display 114, a retention element 122, and an alignment feature 144. The shell 108 may optionally include a processor 204A, memory 208A, and a wireless communication module 232A. Additionally, the shell 108 may include any of the components illustrated in FIG. 2B. In one embodiment, the alignment feature 144 is a void formed on a portion of the interior surface 154 of the shell 108. In one embodiment, the alignment feature 144 has substantially the same shape and dimension as the body alignment feature 140. In another embodiment, the alignment feature is a slot formed transverse to a longitudinal axis of the shell 108 as illustrated, for example, in FIG. 1F. Optionally, the alignment feature 144 is formed on the housing 118 of the shell 108. In another embodiment, a slot 148 is formed on an interior surface 154 of the shell 108. The slot 148 may optionally have a width substantially equal to, or slightly greater than, the width of the retention element 120 of the body 104. Additionally or alternatively, the slot may have a depth substantially equal to, or slightly greater than, a thickness of the retention element 120. Optionally, the slot 148 is formed on each of the retention element 122 and the housing 118 of the body 104. In yet another embodiment, the shell 108 includes an end piece 112. The end piece 112 is removably interconnectable to the shell 108. In one embodiment, the end piece 112 is keyed to the body 104.

The shell 108 is aligned with the body 104, in step 1112. This may include positioning the interior surface 154 of the shell 108 in contact with the exterior surface 116 of the body 104. Optionally, the alignment feature 140 of the body 104 may be positioned within at least a portion of the alignment feature 144 of the shell 108. In one embodiment, the retention element 120 of the body 104 is positioned at least partially within the slot 148 of the shell 108. In another embodiment, the housing 106 of the body 104 is positioned at least partially within a portion of the slot 148 formed in the shell housing 118. In one embodiment, the body 104 includes a display 110 that is hidden from view by the shell 108 during the alignment.

The body 104 is then releasably retained to the shell 108, in step 1116. In one embodiment, this comprises a friction fit formed between the body alignment feature 140 and the shell alignment feature 144. The frictional engagement of the alignment features 140, 144 is configured to prevent inadvertent or unintended release of the shell from the body 104. Additionally or alternatively, one or more of the body 104 and the shell 108 may include a snap or a fastener that may be engaged to retain the body 104 to the shell 108. In another embodiment, the end piece 112 is interconnected to the shell 108 to retain the body 104 to the shell 108. Optionally, a mechanical catch may be engaged to releasably interconnect the shell 108 to the body 104. In yet another example, the body 104 and the shell 108 may include detents that are engaged to form the releasable interconnection. In another embodiment, the body 104 includes a lock and a key or a code is required to disengage the lock before the shell 108 may be removed from the body 104.

Optionally, in step 1120, communication may be established between the body 104 and the shell 108. In one embodiment, this comprises pairing the body 104 and the device as describe in conjunction with FIG. 9. In another embodiment, the wireless communication module 232 of the body 104 establishes a communication link with the wireless communication module 232A of the shell 108. In yet another embodiment, the inductive coils 284, 284A of the body 104 and the shell 108 are used to transfer information between the body 104 and the shell 108. Optionally, in one embodiment, each of the body 104 and the shell 108 include a port interface 152, 152A. Accordingly, the alignment of the shell 108 and the body 104 may further include aligning the port interface 152A of the shell 108 with a corresponding port interface 152 of the body 104. Thereafter, the port interfaces may be used to establish communication between the body 104 and the shell 108. After the communication is established, data may be transferred between the body 104 and the shell 108.

Additionally or alternatively, the body 104 may control the shell display 114. Optionally, a user interface displayed by the body display 110 before the body 104 is releasably retained to the shell 108 is displayed by the shell display 114 after the body 104 is releasably retained to the shell 108. In one embodiment, the body 104 includes a display controller 216B that is operable to generate user interfaces for display on the shell display 114. In another embodiment, the shell 108 is devoid of a processor. In yet another embodiment, the body 104 is operable to control the hardware components of the shell 108 when the body 104 is retained by the shell 108. In one embodiment, the shell display 114 presents a user interface including sensor data collected by the sensor 180 of the body 104. For example, after the body 104 and the shell 108 are interconnected, one or more display portions 115 of the shell display may present biometric data collected by the body 104. Optionally, the sensor data may include the pulse rate and body temperature of a user wearing the device 100.

Additionally or alternatively, power may be transferred from one of the body 104 and the shell 108 to the other one of the shell 108 and the body 104 in step 1128. For example, in one embodiment, the induction coils 284 of the body 104 and the shell 108 may be used to transfer power between the body 104 and the shell 108. Optionally, in another embodiment, the port interfaces 152 may be used to transfer the power. In one embodiment, the shell 108 transfers power to the body 104. Alternatively, in another embodiment, the body 104 transfers power to the shell 108.

Optionally, in step 1128, the wearable device 100 comprising the paired body 104 and shell 108 may establish communication with another device. The other device may comprise one or more peripheral devices 404 or a different wearable device 100. In one embodiment, a communication module 228A, 232A of the shell 108 establishes a wireless communication link with the other device 100, 404. In one embodiment, the other device 100, 404 is worn by a user of the wearable device 100. In another embodiment, the other device 100, 404 is associated with an article of clothing worn by the user. In still another embodiment, the other device 100, 404 is associated with an object. In yet another embodiment, the other device 100, 404 is associated with another person. In still another embodiment, the other device is a server 408 or a smart device, such as a smart phone.

Optionally, the wearable device 100 may provide an alert to the user of the wearable device 100 if the communication link to the other device 100, 404 is severed. Additionally or alternatively, the wearable device may provide an alert to the user if a distance between the wearable device 100 and the other device 100, 404 exceeds a predetermined amount. In another embodiment, the wearable device 100 may provide the alert to the user if the other device 100, 404 moves out of a predetermined geographic area. Additionally or alternatively, in another embodiment, the wearable device 100 may provide an alert to the user of the wearable device if the other device 100, 404 moves into a predetermined geographic area. In still another embodiment, the wearable device may provide an alert to the user of the wearable device 100 if the other device 100, 404 is located in a predetermined class of locations. The predetermined class of locations may comprise approved locations and disapproved locations. For example, a school, a friend's house, a park, and certain businesses may be approved locations. Similarly, certain businesses, certain houses, and certain locations may be disapproved locations.

In step 1132, method 1100 may include determining if a second shell should be added to the paired body 104 and shell 108 of the wearable device 100. Alternatively, in step 1132, method 1100 may include determining if the shell 108 has been removed from the body 104 and that a second shell 108 is available for pairing with the body 104. The second shell 108 (or different shell) may have different capabilities and sensors than the first shell 108. If a second shell 108, or a different shell 108, should be paired with the body 104, the method 1100 loops YES to operation 1008. Otherwise, method 1100 proceeds NO to end 1136.

Figure 12:
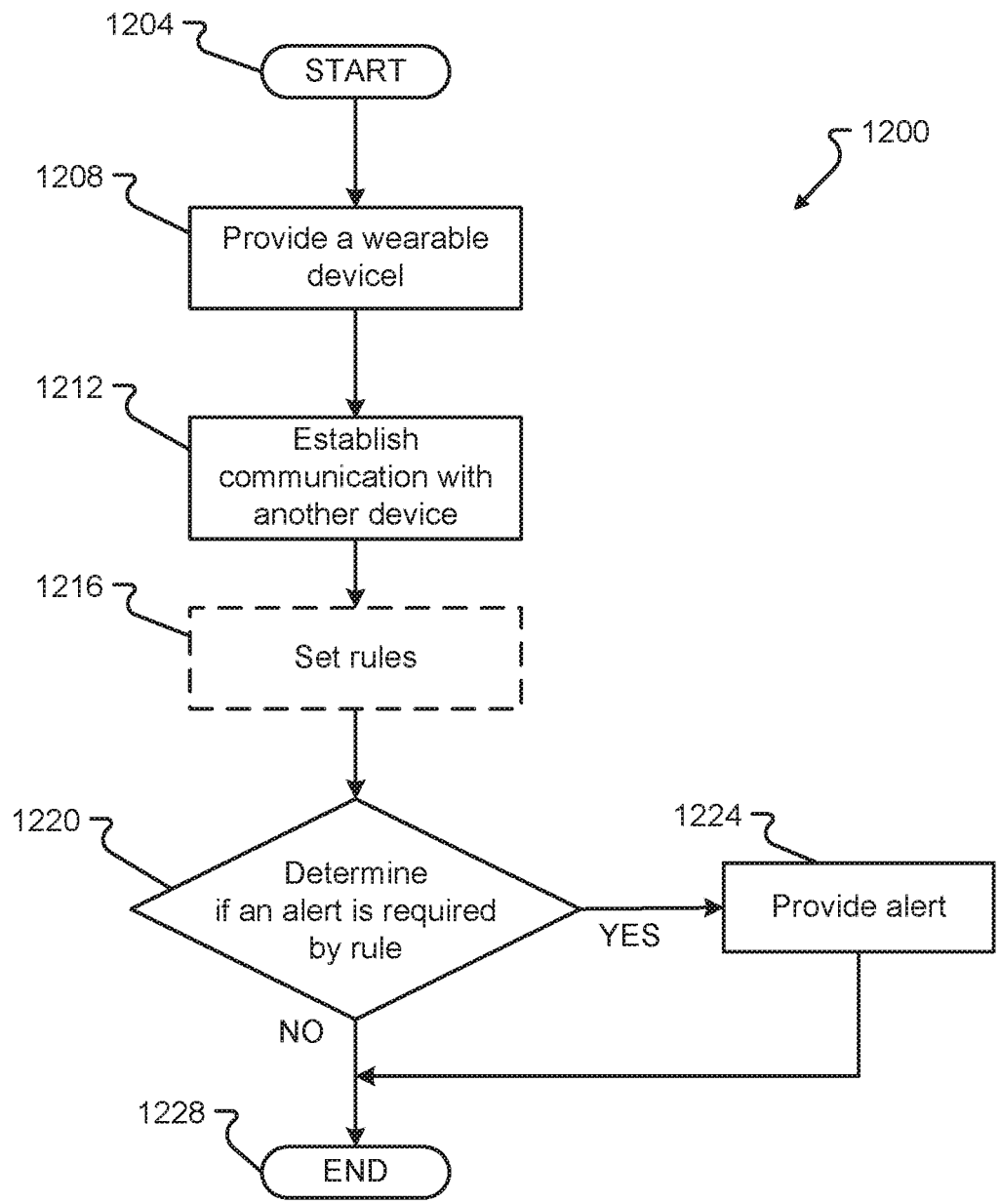
FIG. 12 is another flow chart of an embodiment of a method for providing alerts to a user of a wearable device according to an embodiment of the present disclosure.

Another embodiment of a method 1200 of a wearable device 100 providing alerts to a user of the wearable device 100 is shown in FIG. 12. Generally, the method 1200 starts with a start operation 1204 and ends with an end operation 1228. While a general order for the steps of the method 1200 is shown in FIG. 12, the method 1200 can include more or fewer steps or can arrange the order of the steps differently than those shown in FIG. 12. Additionally, although the operations of the method may be described sequentially, many of the operations may in fact be performed in parallel or concurrently. The method 1200 can be executed as a set of computer-executable instructions executed by a computer system and encoded or stored on a computer readable medium. Hereinafter, the method 1200 shall be explained with reference to the systems, components, modules, software, data structures, user interfaces, etc. described in conjunction with FIGS. 1-11.

A wearable device 100 is provided in step 1208. The wearable device may comprise a body 104 paired to a shell 108. Optionally, the wearable device 100 may comprise a second shell 108 paired with the body 104 and the shell 108, for example, as illustrated in FIG. 1K.

The wearable device 100 establishes communication with a second device in step 1212. The second device may comprise one or more of a peripheral device 400, a server 408, and another wearable device 100. In one embodiment, the second device comprises a smart phone. The peripheral device 400 may be associated with a broach, a ring, earrings, buttons, a tie tack or tie clip, an item worn in the user's hair, a necklace, a belt buckle, a pins, glasses, clothing (including a shirt or shoes), or an object, such as a package, luggage, a box, or any other item. The peripheral device 400 or the other wearable device 100 may be associated with the user or another person. For example, in one embodiment, the second device is a peripheral device 400 worn by a child. In another embodiment, the second device is another wearable device 100 carried by a co-worker of the user. In still another embodiment, the second device is associated with an object.

In one embodiment, a communications module 228A, 232A of the shell 108 establishes the communication link with the second device. Alternatively, in another embodiment, a communications module 232 of the body 104 establishes the communication link with the second device.

Optionally, rules are set in step 1216. Alternatively, the rules may be pre-set in memory 208, 208A of the wearable device. More specifically, in one embodiment, the user of the communication device 100 may establish one or more rules associated with the communication link to the second device. The rules are stored in memory 208, 208A of the wearable device 100. The rules may include, but are not limited to, alerts associated with predetermined events, alerts when predetermined events do not occur, alerts associated with a position of the second device, alerts related to a distance between the wearable device 100 and the second device, and alerts associated with changes, or loss, of the communication link.

In one embodiment, a rule may require an alert to the user of the wearable device 100 if the communication link to the second device is severed. Additionally or alternatively, another rule may require an alert to the user of the wearable device 100 if a distance between the wearable device 100 and the second device changes by a predetermined amount or exceeds a predetermined amount. In another embodiment, a rule may require an alert to the user of the wearable device 100 if the second device moves out of a predetermined geographic area. In still another embodiment, a rule may require an alert to the user if the second device moves. In one embodiment, a rule may require an alert to the user of the wearable device 100 if the second device moves into a predetermined geographic area. In still another embodiment, another rule may require an alert to the user of the wearable device 100 if the second device is located in a predetermined class of locations. The predetermined class of locations may comprise approved locations and disapproved locations. For example, a school, a friend's house, a park, and certain businesses may be approved locations. Similarly, certain businesses, certain houses, and certain locations may be disapproved locations.

The wearable device 100 may then monitor the second device and determine if an alert is required by the rules, in step 1220. If an alert is required by the rules, method 1200 may proceed YES to step 1224. If no alert is required, method 1200 may proceed NO to step 1228.

In step 1224, the wearable device 100 provides the alert to the user. The alert may comprise a vibration, an audible noise produced by an audio I/O interface 244, 244A, or visual indication on display 110, 114 of the wearable device 100.

After providing the alert, the method 1200 may optionally loop if the user enters a new rule. Additionally or alternatively, the method 1200 may wait and continue monitoring the second device to determine if another alert is required by the rules. Otherwise, method 1200 may proceed to end 1228.

The exemplary systems and methods of this disclosure have been described in relation to an ecosystem for wearables. However, to avoid unnecessarily obscuring the present disclosure, the preceding description omits a number of known structures and devices. This omission is not to be construed as a limitation of the scope of the claims. Specific details are set forth to provide an understanding of the present disclosure. It should however be appreciated that the present disclosure may be practiced in a variety of ways beyond the specific detail set forth herein Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

It should be appreciated that the various processing modules (e.g., processors, modules, etc.), for example, can perform, monitor, and/or control critical and non-critical tasks, functions, and operations, such as interaction with and/or monitoring and/or control of sensors and device operation.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A wearable device, comprising:
    a body comprising:
        a housing configured to receive a shell;
        a processor, wherein the processor:
            determines whether a shell has previously paired with the body;
            when the shell has not previously paired with the body, determines whether pairing of the shell with the body is authorized, wherein in determining whether the pairing is authorized, the processor further:
                determines if a housing of the shell is in contact with the housing of the body for a predetermined period of time;
            exchanges authorization credentials with the shell;
            determines a level of access to provide to the body;
        a sensor;
        a memory to store information collected by the sensor; and
        a communications module to communicate with the shell; and
    the shell comprising:
        a housing configured to releasably interconnect to the body;
        a communications module configured to communicate with the body; and
        a display to present information collected by the sensor and stored in the memory of the body.

2. The wearable device of claim 1, wherein the body is substantially waterproof and devoid of external electrical inputs.

3. The wearable device of claim 1, further comprising:
    a first alignment feature formed on an exterior surface of the body; and
    a second alignment feature formed on an interior surface of the shell, the first and second alignment features being of substantially the same size.

4. The wearable device of claim 3, wherein the first alignment feature protrudes from the body and the second alignment feature is recessed into the shell.

5. The wearable device of claim 1, further comprising:
    a first band removably interconnected to the housing of the body, the band adapted to fit a wrist of a user; and
    a second band removably interconnected to the housing of the shell, wherein when the shell is interconnected to the body, the second band and the shell housing cover an exterior surface of the first band and the body housing.

6. The wearable device of claim 1, further comprising:
    a first induction coil associated with the body; and
    a second induction coil associated with the shell that substantially aligns with the first induction coil when the shell is interconnected to the body.

7. The wearable device of claim 6, wherein, when the shell is interconnected to the body, power is transferable from the second induction coil of the shell to the first induction coil of the body.

8. The wearable device of claim 1, wherein a portion of the sensor protrudes at least partially from an interior surface of the shell housing proximate to skin of a user when the body is positioned on the user's wrist.

9. A non-transitory computer readable medium having stored thereon computer-executable instructions, the computer executable instructions causing a processor of a body to execute a method of pairing the body with a shell, the computer-executable instructions comprising:
    an instruction to perceive a presence of the shell to the body, wherein the body comprises a housing configured to receive the shell, a sensor, a memory to store information collected by the sensor, and a communications module to communication with the shell, and wherein the shell comprises a housing configured to releasably interconnect to the body, a communications module configured to communicate with the body, and a display;
    an instruction to determine whether the shell has previously paired with the body;
    when the shell has not previously paired with the body, an instruction to determine whether pairing of the shell with the body is authorized, wherein determining whether the pairing is authorized comprises:
        an instruction to determine if the shell housing is in contact with the body housing for a predetermined period of time;
    an instruction to exchange authorization credentials with the shell; and
    an instruction to determine a level of access to provide to the body.

10. The non-transitory computer readable medium of claim 9, further comprising:
    an instruction to determine capabilities of the shell after the pairing the body with the shell, wherein the shell one of:

adds capabilities to the body; and
does not change the capabilities of the body, wherein the shell is decorative.

11. The non-transitory computer readable medium of claim 9, further comprising:
an instruction to determine whether to change a device mode in response to the pairing of the body with the shell.

12. The non-transitory computer readable medium of claim 9, further comprising:
an instruction to present data collected by the sensor on the display of the shell.

13. The non-transitory computer readable medium of claim 9, wherein after the pairing the processor of the body controls the display of the shell.

14. The non-transitory computer readable medium of claim 9, wherein determining whether the pairing is authorized comprises an instruction to determine if the shell and the body are in contact with a charging station.

15. A wearable device, comprising:
a body having a housing configured to receive an outer shell, the body comprising:
a processor;
a memory;
a sensor, wherein the memory is configured to store information collected from the sensor;
a communications module configured to communicate with the outer shell the outer shell, comprising:
a shell housing having at least one feature configured to operatively couple with the housing of the body; and
a shell communications module configured to communicate with the communications module of the body
a second processor;
a second memory; and
a display configured to present a graphical user interface including at least some of the information collected by the sensor;
wherein the outer shell is configured to receive a second outer shell comprising:
a second shell housing having at least one feature configured to operatively couple with the shell housing of the outer shell; and
a second shell communications module configured to communicate with at least one of the communications module of the body and the shell communications module, wherein the body is configured to operate with or without the outer shell and/or second outer shell, wherein the outer shell is configured to increase a functionality of the body and wearable device or decrease the functionality of the body and wearable device, wherein the second outer shell is configured to increase a functionality of the body, the outer shell, and the wearable device or decrease the functionality of the body, the outer shell, and the wearable device, and wherein one of the outer shell and the second shell is decorative and does not change the capabilities of the wearable device.

\* \* \* \* \*